(12) United States Patent
Maesen et al.

(10) Patent No.: US 10,968,405 B2
(45) Date of Patent: *Apr. 6, 2021

(54) CATALYTIC REMEDY FOR ADVANCED UCO BLEED REDUCTION IN RECYCLE HYDROCRACKING OPERATIONS

(71) Applicant: Chevron U.S.A. Inc., San Ramon, CA (US)

(72) Inventors: Theodoras Ludovicus Michael Maesen, Moraga, CA (US); Derek Blackwell, Richmond, CA (US); Viorel Duma, Hercules, CA (US); Varut Komalarajun, San Ramon, CA (US); Alexander E. Kuperman, Orinda, CA (US); Hyunuk Ryu, Richmond, CA (US); Horacio Trevino, Richmond, CA (US); Alex Yoon, Richmond, CA (US); Ujjal Mukherjee, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,545

(22) Filed: Aug. 6, 2019

(65) Prior Publication Data

US 2020/0048566 A1 Feb. 13, 2020

Related U.S. Application Data

(60) Provisional application No. 62/715,557, filed on Aug. 7, 2018.

(51) Int. Cl.
*C10G 47/00* (2006.01)
*C10G 47/34* (2006.01)
(Continued)

(52) U.S. Cl.
CPC .......... *C10G 47/20* (2013.01); *B01J 31/0211* (2013.01); *B01J 31/04* (2013.01); *B01J 31/2204* (2013.01);
(Continued)

(58) Field of Classification Search
None
See application file for complete search history.

(56) References Cited

U.S. PATENT DOCUMENTS 7,622,034 B1 11/2009 Thakkar et al.
7,713,407 B2 5/2010 Tracy, III et al.
(Continued)

FOREIGN PATENT DOCUMENTS

GB 1267416 A 3/1972

OTHER PUBLICATIONS

International Search Report dated Oct. 15, 2019 in corresponding PCT/US19/045415.

*Primary Examiner* — Tam M Nguyen
(74) *Attorney, Agent, or Firm* — E. Joseph Gess; Melissa M. Hayworth; Terrence M. Flaherty

(57) ABSTRACT

A catalyst system has been designed that disrupts the sedimentation process. The catalyst system achieves this by saturating key feed components before the feed components are stripped into their incompatible aromatic cores. The efficacy of this disruptive catalyst system is particularly evident in a hydrocracker configuration that runs in two-stage-recycle operation. The catalyst is a self-supported multi-metallic catalyst prepared from a precursor in the hydroxide form, and the catalyst must be toward the top level of the second stage of the two-stage system.

12 Claims, 13 Drawing Sheets
(2 of 13 Drawing Sheet(s) Filed in Color)

(51) Int. Cl.
  *C10G 65/12* (2006.01)
  *C10G 47/20* (2006.01)
  *B01J 31/02* (2006.01)
  *B01J 31/22* (2006.01)
  *B01J 31/04* (2006.01)
  *B01J 37/20* (2006.01)
  *C10G 67/02* (2006.01)

(52) U.S. Cl.
  CPC .............. *B01J 37/20* (2013.01); *C10G 47/34* (2013.01); *C10G 65/12* (2013.01); *C10G 67/02* (2013.01); *B01J 2231/646* (2013.01); *B01J 2531/0211* (2013.01); *C10G 2300/1074* (2013.01); *C10G 2300/70* (2013.01); *C10G 2400/04* (2013.01); *C10G 2400/08* (2013.01)

(56) References Cited

U.S. PATENT DOCUMENTS

| | | | |
|---|---|---|---|
| 7,763,218 B2 * | 7/2010 | Hunter | C10G 65/12 422/632 |
| 7,910,761 B2 | 3/2011 | Maesen et al. | |
| 8,002,967 B2 * | 8/2011 | Hunter | C10G 65/12 208/89 |
| 8,747,653 B2 * | 6/2014 | Wieber | C10G 65/12 208/78 |
| 8,894,839 B2 * | 11/2014 | Ramaseshan | C10G 67/06 208/58 |
| 9,919,987 B1 | 3/2018 | Zhan et al. | |
| 2009/0107883 A1 | 4/2009 | Maesen et al. | |
| 2011/0315596 A1 * | 12/2011 | Prentice | C10G 45/64 208/59 |
| 2014/0262942 A1 * | 9/2014 | Arora | C10G 65/00 208/59 |
| 2015/0136645 A1 | 5/2015 | Bhattacharya et al. | |
| 2015/0136646 A1 | 5/2015 | Zhan et al. | |
| 2015/0152343 A1 * | 6/2015 | Vijay | C10G 69/08 208/60 |
| 2016/0115400 A1 * | 4/2016 | Sun | B01J 8/22 208/89 |
| 2016/0177203 A1 * | 6/2016 | Morel | C10G 67/049 208/66 |
| 2018/0023014 A1 * | 1/2018 | Li | C10G 67/00 208/403 |
| 2019/0144764 A1 * | 5/2019 | Van Wees | B01D 3/10 208/112 |

* cited by examiner

115 PCI  250 PCI  450 PCI  500 PCI  620 PCI  645 PCI

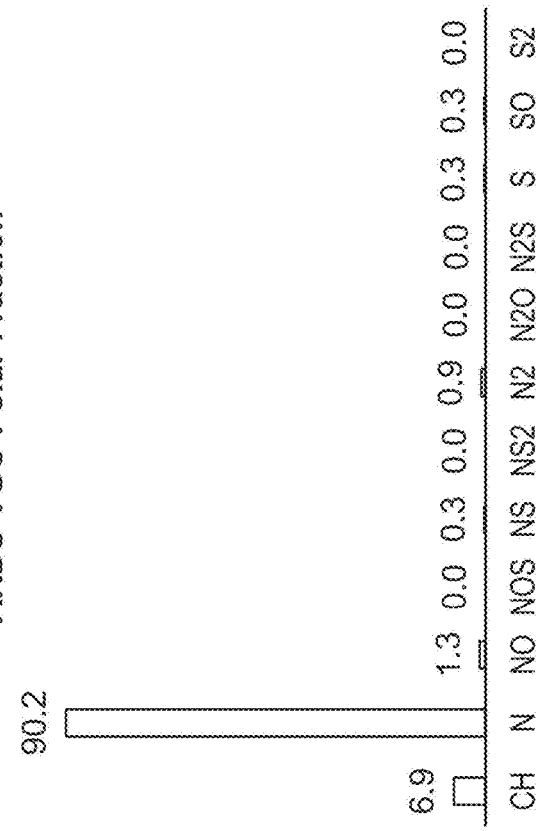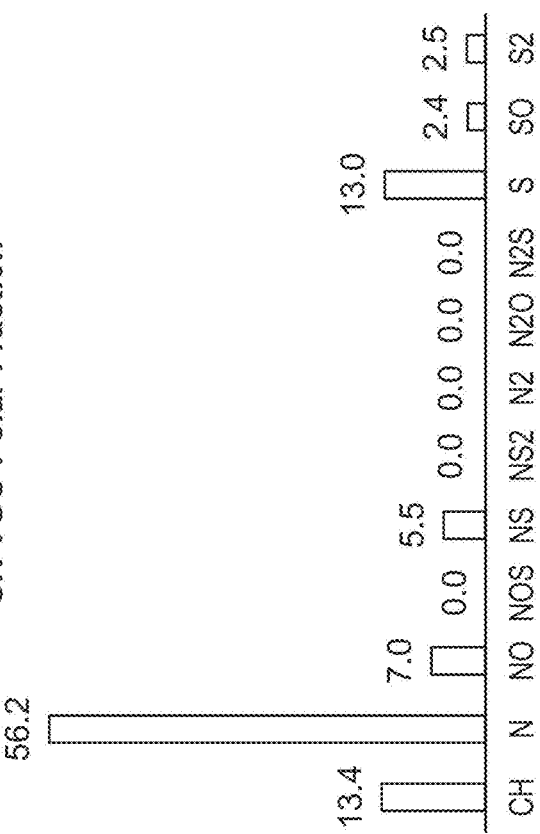
FIG. 5A  FIG. 5B  FIG. 5C  FIG. 5D

CATALYTIC REMEDY FOR ADVANCED UCO BLEED REDUCTION IN RECYCLE HYDROCRACKING OPERATIONS

CROSS-REFERENCE TO RELATED APPLICATIONS

The present application claims priority from U.S. Provisional Patent Application No. 62/715,557, filed Aug. 7, 2018, the complete disclosure of which is incorporated herein by reference in its entirety for all purposes.

BACKGROUND

Field of the Invention

The present application relates to a catalyst system and its use in hydrocarbon reforming systems. More specifically, the present application relates to a catalyst system which effectively disrupts sedimentation in a two stage system, especially in a hydrocracking operation.

Background of the Invention

A refinery's flexibility and responsiveness to market dynamics and regulatory environments has a major impact on its competitive position. Several factors drive this need for responsiveness including the availability of inexpensive opportunity crudes and compatible cutter stocks, tightening regulations on residual fuel oil, and price differentials between petrochemical feedstocks, base oil and transportation fuels. Tighter specifications on refinery process schemes combined with more robust catalyst systems affords more sustainability turning a larger portfolio of opportunity feedstocks into a product slate that is more in sync with the market dynamics.

Refineries impose constraints on operations to maximize operational reliability. Recent process and catalyst options have been developed that significantly reduce and refine these constraints postures. With the production of light crudes and heavy crudes increasing and with medium crudes in decline, more and more refineries are feeding opportunity blends of light and heavy crudes. These crude blends raise compatibility concerns, and they can challenge the distillation train, which frequently exacerbates entrainment of residual oil in the hydrocracker feed. Entrained residual oil has a deleterious impact on hydrocracker performance, even if the entrainment is so small that it is close to the detection limit of standard analytical techniques. If capital is available, one can invest in improved process options to improve the hydrocracker feedstock, and thereby mitigate the exposure to the negative impact of opportunity crudes. Illustrating the current urgency of the need to address compatibility issues, solutions such as distillation and absorption of the offending components are currently being put into practice, long after they were initially proposed. A capital-neutral solution is a catalyst system that can mitigate the risk associated with only a minor increase in end boiling point of the feedstock to the hydrocracker.

Residual oil entrained in the feed to a hydrocracker designed to hydroprocess vacuum gas oil is a problem, because parts of the residual oil frequently do not maintain their compatibility once the feed starts to be hydroprocessed. Compatibility is lost because hydroprocessing strips the complex residual oil molecules initially dissolved in the feed down to polycyclic aromatic cores, while simultaneously saturating the feed into a less aromatic stream that is less hospitable to large aromatics. Compatibility is further reduced by the condensation of smaller aromatics into thermodynamically more favored larger configurations. This simultaneous formation of a more aromatic solute and a less aromatic solvent can create nano-emulsions, which can form mesophases (liquid crystals) that can ultimately sediment out either inside the reactor or inside equipment downstream from the reactor.

An improved method and system for addressing the compatibility and sedimentation issues are in great demand.

BRIEF SUMMARY

A catalyst system has been designed that disrupts the sedimentation process. The catalyst system achieves this by saturating key feed components before the feed components are stripped into their incompatible aromatic cores. The efficacy of this disruptive catalyst system is particularly evident in a hydrocracker configuration that runs in two-stage-recycle operation. The catalyst is a self-supported or co-gel multi-metallic catalyst prepared from a precursor in the hydroxide form, and the catalyst must be in the top level of the second stage of the two-stage system. The positioning of the catalyst system within the two-stage-recycle operation is most important.

Among other factors, it has been found that a process employing multi-metallic co-gel catalyst prepared from a precursor in the hydroxide form in the upper level of the second stage in a two-stage hydrocracking system, causes a reaction which disrupts possible sedimentation. The catalytic reactions at that point in the two-stage system maintain compatibility through the use of a catalyst which is effective in saturating key feed components before the key components are stripped into their incompatible aromatic cores, which catalyst is a self-supported multi-metallic catalyst prepared from a precursor in the hydroxide form. This is of particular importance when recycle of hydrocracked product occurs from a separation/distillation column at the end of the two-stage hydrocracking system.

BRIEF DESCRIPTION OF THE DRAWINGS

FIGS. 5A-D demonstrate that the present catalyst system is more active in hydrodesulphurization of a vacuum gasoil (VGO feed partially made through atmospheric residue hydrodesulphurization (ARDS), so that it yields a lower sulfur product. FIGS. 5A and B relate to a typical Middle Eastern VGO, and FIGS. 5C and D related to a VGO made through atmospheric residue hydrodesulphurization (ARDS).

DETAILED DESCRIPTION

The present process is a two-stage hydrocracking process for converting a petroleum feed to lower boiling products. The process comprises hydrotreating a petroleum feed in the presence of hydrogen to produce a hydrotreated effluent stream comprising a liquid product. At least a portion of the hydrotreated stream effluent is passed to a hydrocracking stage comprising more than one reaction zone, with the effluent passed to a first reaction zone in the hydrocracking stage. This first reaction zone comprises a self-supported multi-metallic catalyst prepared from a precursor in the hydroxide form. The first reaction zone is importantly the top level of the hydrocracking stage. The reaction produces a first hydrocracked effluent stream.

The first hydrocracked effluent stream is then passed to a second reaction zone of the hydrocracking stage.

In one embodiment, the hydrotreated effluent stream is passed directly to the second stage, hydrocracking reactor. Bottoms effluent from the second stage can then be passed to a distillation column.

Figure 1:
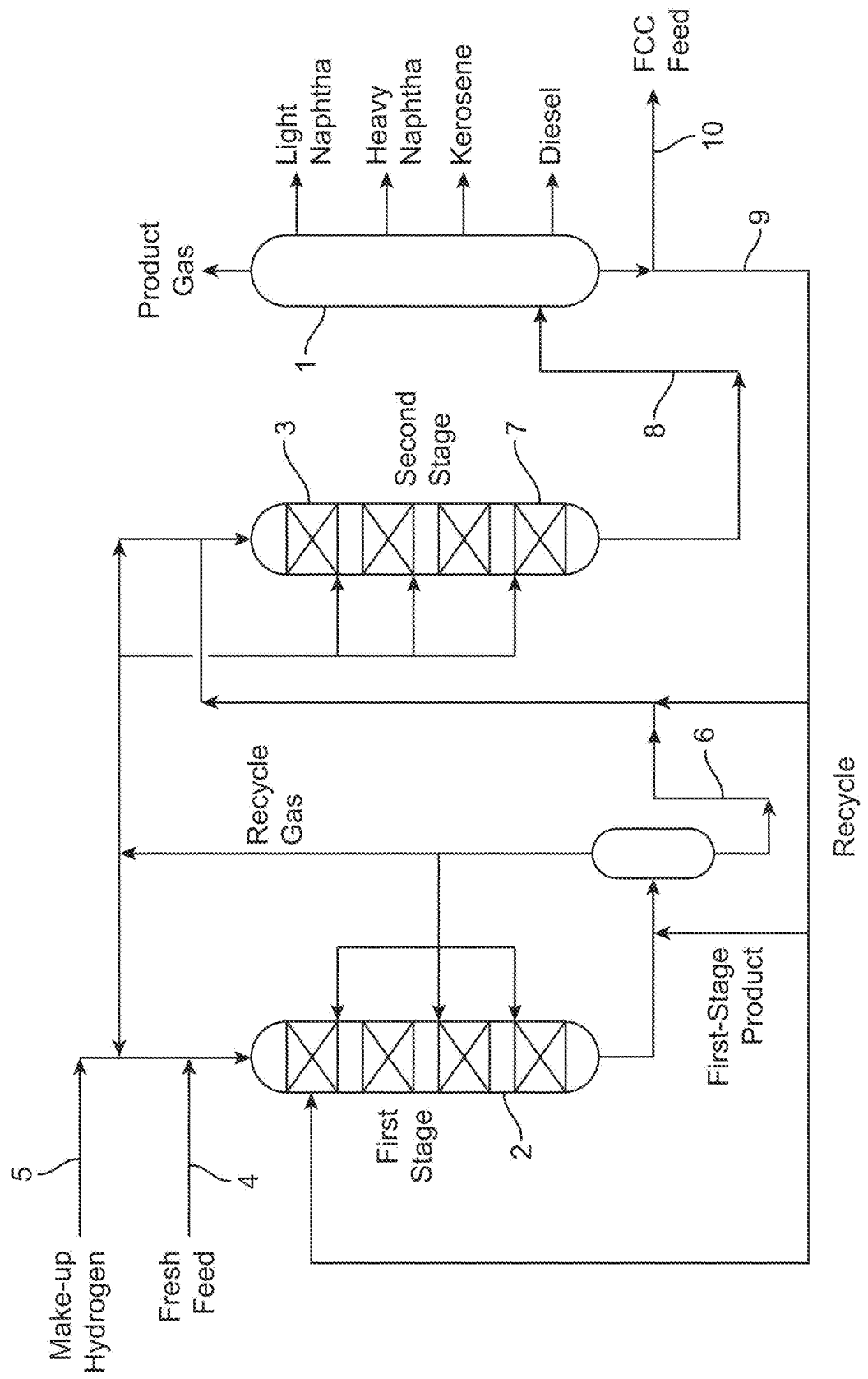
FIG. 1 depicts a two-stage reactor system comprising two reactors with a distillation column at the end of the system, after the two reactors. The reaction system comprises a recycle loop.
Figures 2A, 2B, 2C, 2D, 2E, 2F:
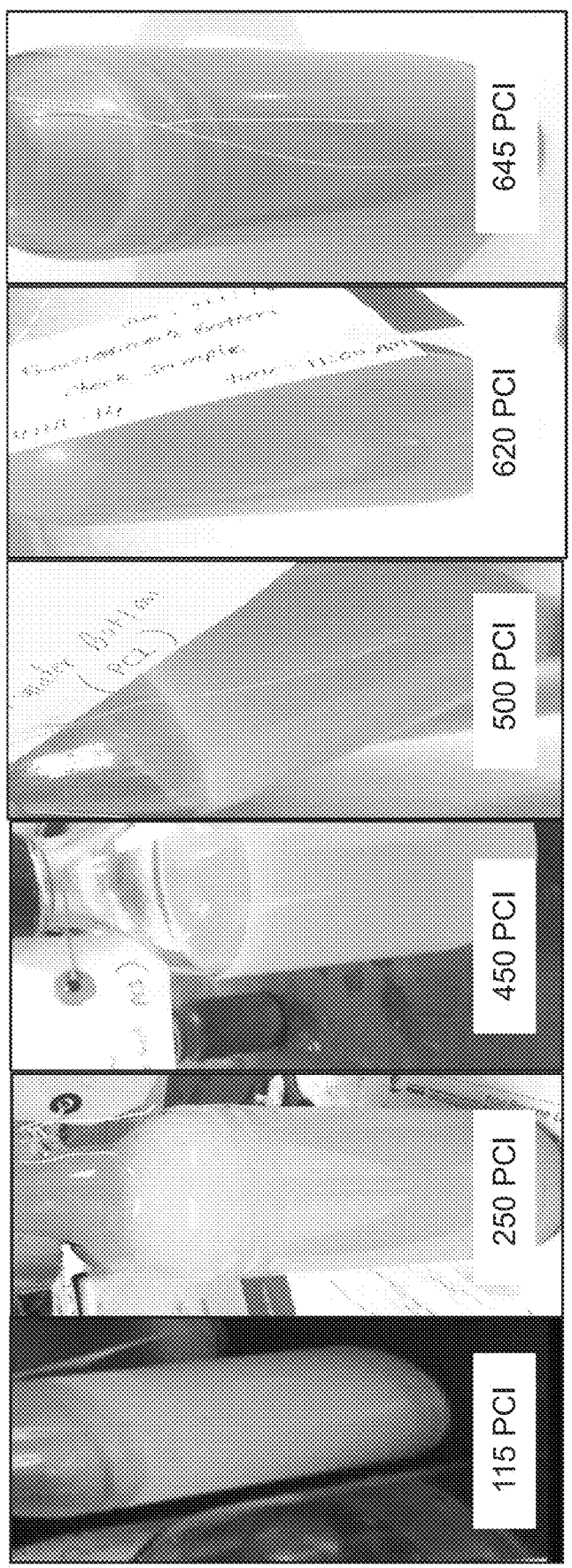
FIGS. 2A-F demonstrate the variances in color of the recycle stream as the polycyclic aromatic index (PCI) varies.

In one embodiment, cuts of light naphtha, heavy naphtha, kerosene and diesel are recovered from the distillation column (FIG. 1). Bottoms from the distillation column can also be recycled to the second stage, hydrocracking reactor; and/or to the first stage (FIG. 1). A portion of the bottoms from the distillation column can also be passed as bleed to an FCC (FIG. 1).

In one embodiment of the process, the hydrocracking stage comprises at least one reaction zone below the first reaction zone which is a hydrodesulphurization zone. The hydrocracking stage can comprise, for example, two to four reaction zones, wherein the bottom reaction zone is a hydrodesulphurization zone.

The hydrodesulphurization zone can comprise a bulk multimetallic catalyst comprised of one Group VIII noble metal and two Group VII B metals.

The various reaction zones can be operated under conventional conditions for hydrotreating, hydrocracking (and hydrodesulfurization). The conditions can vary, but typically, for either hydrotreating or hydrocracking, the reaction temperature is between about 250° C. and about 500° C. (482° F.-932° F.), pressures from about 3.5 MPa to about 24.2 MPa (500-3,500 psi), and a feed rate (vol oil/vol cat h) from about 0.1 to about 20 hr$^{-1}$. Hydrogen circulation rates are generally in the range from about 350 std liters H$_2$/kg oil to 1780 std liters H$_2$/kg oil (2.310-11,750 standard cubic feet per barrel). Preferred reaction temperatures range from about 340° C. to about 455° C. (644° F.-851° F.). Preferred total reaction pressures range from about 7.0 MPa to about 20.7 MPa (1,000-3,000 psi). The reactors can also be operated in any suitable catalyst-bed arrangement mode, for example, fixed bed, slurry bed, or ebulating bed although fixed bed, co-current downflow is normally utilized.

The catalyst used in the present process, specifically in the first reaction zone of the hydrocracking stage, is specifically a self-supported multi-metallic catalyst (a bulk catalyst) prepared by sulfiding a cogel precursor of the formula:

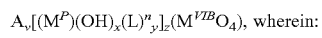

$A_v[(M^P)(OH)_x(L^n)_y]_z(M^{VIB}O_4)$, wherein:

A is one monovalent cationic species;

$M^P$ is a promoter metal with an oxidation state of +2 or +4 selected from one or more of Group IIA, Group IIB, Group IVA, and Group VIII metals (especially a Group VIII, such as Ni);

L is an organic oxygen-containing ligand (e.g., maleate); and $M^{VIB}$ is Group VIB metal (e.g., one or more of Mo, W).

The present catalyst is described in U.S. Pat. No. 7,910,761, the contents of which is hereby incorporated herein by reference in their entirety.

In one embodiment. L is one or more oxygen—containing ligands, and L has a neutral or negative charge n≤O.

In one embodiment, $M^{VIB}$ is at least one Group VIB metal having an oxidation state of +6.

In one embodiment, $M^P:M^{VIB}$ has an atomic ratio between 100:1 and 1:100.

In one embodiment, v−2+P*z−x*+N*y*z=0.

An important aspect of the catalyst precursor (prior to sulfidation) is that it is in the hydroxide form. Self-supported multimetallic catalyst precursors that are in the oxide form, e.g., (Ni)$_a$ (Mo)$_b$ (W)$_c$ O$_z$, are not useful.

In one embodiment, L is selected from carboxylates, carboxylic acids, aldehydes, ketones, the enolate forms of aldehydes, the enolate forms of ketones, and hemiacetals, and combinations thereof.

In one embodiment. A is selected from monovalent cations such as NH$_4^+$, other quaternary ammonium ions, organic phosphonium cations, alkali metal cations, and combinations thereof.

In one embodiment where both molybdenum and tungsten are used as the Group VIB metals, the molybdenum to tungsten atomic ratio (Mo:W) is in the range of about 10:1 to 1:10. In another embodiment, the ratio of Mo:W is between about 1.1 and 1:5. In an embodiment where molybdenum and tungsten are used as the Group VIB metals, the charge-neutral catalyst precursor is of the formula $A_v[(M^P)(OH)_x (L^n)_y]_z (Mo_tW_tO_4)$. In yet another embodiment, where molybdenum and tungsten are used as the Group VIB metals, chromium can be substituted for some or all of the tungsten with the ratio of (Cr+W):Mo is in the range of about 10-1 to 1-10. In another embodiment, the ratio of (Cr+W):Mo is between 1:1 and 1:5. In an embodiment where molybdenum, tungsten, and chromium are the Group VIB metals, the charge-neutral catalyst precursor is of the formula $A_v[(M^P) (OH)_x (L^n)_y]_z (Mo_tW_tCr_tO_4)$.

In one embodiment, the Promoter metal $M^P$ is at least a Group VIII metal with $M^P$ having an oxidation state of +2 and the catalyst precursor of the formula $A_v[(M^P) (OH)_x (L^n)_y]_z (M^{VIB}O_4)$ to have (v−2+2z−x*z+n*y*z)=0.

In one embodiment where the Promoter metal $M^P$ is a mixture of two Group VIII metals such as Ni and Co. In yet another embodiment, $M^P$ is a combination of three metals such as Ni, Co and Fe.

In one embodiment where $M^P$ is a mixture of two group IIB metals such as Zn and Cd, the charge-neutral catalyst precursor is of the formula $A_v[(Zn_aCd_{a'})(OH)_x(L)_y]_z(M^{VIB}O_4)$. In yet another embodiment, $M^P$ is a combination of three metals such as Zn, Cd and Hg, the charge-neutral catalyst precursor is of the formula $A_v[(Zn_aCd_{a'}Hg_{a''})(OH)_x(L)''_y]_z(M^{VIB}O_4)$.

In one embodiment wherein $M^P$ is a mixture of two Group IVA metals such as Ge and Sn, the charge-neutral catalyst precursor is of the formula $A_v[(Ge_b,Sn_{b'})(OH)_x(L)''_y]_z(M^{VIB}O_4)$. In another embodiment wherein $M^P$ is a combination of three Group IVA metals such as Ge, Sn, and Pb, the charge-neutral catalyst precursor is of the formula $A_v[(Ge_bSn_{b'}Pba_{b''})(OH)_x(L)''_y]_z(M^{VIB}O_4)$.

Promoter Metal Component $M^P$: In one embodiment, the source for the Promoter metal ($M^P$) compound is in a solution state, with the whole amount of the Promoter metal compound dissolved in a liquid to form a homogeneous solution. In another embodiment, the source for the Promoter metal is partly present as a solid and partly dissolved in the liquid. In a third embodiment, it is completely in the solid state.

The Promoter metal compound $M^P$ can be a metal salt or mixtures of metal salts selected from nitrates, hydrated nitrates, chlorides, hydrated chlorides, sulphates, hydrated sulphates, carbonates, formates, acetates, oxalates, citrates, maleates, fumarate, phosphates, hypophosphites, and mixtures thereof.

In one embodiment, the Promoter metal $M^P$ is a nickel compound which is at least partly in the solid state, e.g., a water-insoluble nickel compound such as nickel carbonate, nickel hydroxide, nickel phosphate, nickel phosphite, nickel formate, nickel fumarate, nickel oxalate, nickel sulphide, nickel molybdate, nickel tungstate, nickel oxide, nickel alloys such as nickel-molybdenum alloys, Raney nickel, or mixtures thereof.

In one embodiment, the Promoter metal $M^P$ is selected from the group of IIB and VIA metals such as zinc, cadmium, mercury, germanium, tin or lead, and combinations thereof, in their elemental, compound, or ionic form. In yet another embodiment, the Promoter metal $M^P$ further comprises at least one of Ni. Co. Fe and combinations thereof, in their elemental, compound, or ionic form.

In one embodiment, the Promoter metal compound is a zinc compound which is at least partly in the solid state, e.g., a zinc compound poorly soluble m water such as zinc carbonate, zinc hydroxide, zinc phosphate, zinc phosphite, zinc formate, zinc fumarate, zinc sulphide, zinc molybdate, zinc tungstate, zinc oxide, zinc alloys such as zinc-molybdenum alloys.

In an embodiment, the Promoter metal is a Group IIA metal compound, selected from the group of magnesium, calcium, strontium and barium compounds such are at least partly in the solid state, e.g., a water-insoluble compound such as a carbonate, hydroxide, fumarate, phosphate, phosphite, sulphide, molybdate, tungstate, oxide, or mixtures thereof.

In one embodiment, the Promoter metal compound is a tin compound which is at least partly in the solid state, e.g., a tin compound poorly soluble in water such as stannic acid, tin phosphate, tin formate, tin acetate, tin molybdate, tin tungstate, tin oxide, tin alloys such as tin-molybdenum alloys.

Group VIB Metal Component: The Group VIB metal ($M^{VIB}$) compound can be added in the solid, partially dissolved, or solution state. In one embodiment, the Group VIB metal compound is selected from molybdenum, chromium, tungsten compounds, and combinations thereof. Examples of such compounds include, but are not limited to, alkali metal, alkaline earth, or ammonium metallates of molybdenum, tungsten, or chromium, (e.g., ammonium tungstate, meta-, para-, hexa-, or polytungstate, ammonium chromate, ammonium molybdate, iso-, peroxo-, di-, tri-, tetra-, hepta-, octa-, or tetradecamolybdate, alkali metal heptamolybdates, alkali metal orthomolybdates, or alkali metal isomolybdates), ammonium salts of phosphomolybdic acids, ammonium salts of phosphotunstic acids, annmonium salts of phosphochromic acids, molybdenum (di- and tri) oxide, tungsten (di- and tri) oxide, chromium or chromic oxide, molybdenum carbide, molybdenum nitride, aluminum molybdate, molybdic acid, chromic acid, tungstic acid, Mo—P heteropolyanion compounds, Wo—Si heteropolyanion compounds, W—P heteropolyanion compounds. W—Si heteropoly anion compounds, Ni—Mo—W heteropolyanion compounds, Co—Mo—W heteropolyanion compounds, or mixtures thereof, added in the solid, partially dissolved, or solute state.

Chelating Agent (Ligand) L: In one embodiment, the catalyst precursor composition comprises at least a non-toxic organic oxygen containing ligand with an LD50 rate (as single oral dose to rats) of greater than 500 mg/Kg. In a second embodiment, the organic oxygen containing ligand L has an LD50 rate of >700 mg/Kg. In a third embodiment, organic oxygen containing chelating agent has an LD50 rate of >1000 mg/Kg. As used herein, the term "non-toxic" means the ligand has an LD50 rate (as single oral dose to rats) of greater than 500) mg/Kg. As used herein the term "at least an organic oxygen containing ligand" means the composition may have more than one organic oxygen containing ligand in some embodiments, and some of the organic oxygen containing ligand may have an LD50 rate of <500 mg/Kg, but at least one of the organic oxygen containing ligands has an LD50 rate of >500 mg/Kg.

In one embodiment, the oxygen-containing chelating agent L is selected from the group of non-toxic organic acid addition salts such as formic acid, acetic acid, propionic acid, maleic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids such as benzoic acid. In one embodiment, the oxygen-containing chelating agent L is maleic acid (LD of 708 mg/kg).

In one another embodiment, the non-toxic chelating agent L is selected from the group of glycolic acid (having an LD50 of 1950 mg/kg), lactic acid (LD50 of 3543 mg/kg), tartaric acid (LD50 of 7500 mg/kg), malic acid (LD50 of 1600 mg/kg), citric acid (LD50 of 5040 mg/kg), gluconic acid (LD50 of 10380 mg/kg), methoxy-acetic acid (LD50 of 3200 mg/kg), ethoxy-acetic acid (LD50 of 1292 mg/kg), malonic acid (LD 50 of 1310 mg/Kg), succinic acid (LD 50 of 500 mg/kg), fumaric acid (LD50 of 10700 mg/kg), and glyoxylic (LD 50 of 3000 mg/kg). In yet embodiment the non-toxic chelating agent is selected from the group of organic sulfur compounds including but not limited to mercapto-succinic acid (LD 50 of 800 mg/kg) and thiodiglycolic acid (LD 50 of 500 mg/kg).

In yet another the oxygen containing ligand L is a carboxylate containing compound. In one embodiment, the carboxylate compound contains one or more carboxylate functional groups. In yet another embodiment, the carboxylate compound comprises monocarboxylates including, but not limited to, formate, acetate, propionate, butyrate, pentanoate, and hexanoate and dicarboxylates including, but not limited to, oxalate, malonate, succinate, glutarate, adipate, malate, maleate, fumarate, and combinations thereof. In a fourth embodiment, the carboxylate compound comprises maleate.

The organic oxygen containing ligands can be mixed with the Promoter metal containing solution or mixture, the Group VIB metal containing solution or mixture, or a combination of the Promoter metal and Group VIB metal containing precipitates, solutions, or mixtures. The organic oxygen containing ligands can be in a solution state, with the whole amount of the organic oxygen containing ligands dissolved in a liquid such as water. The organic oxygen containing ligands can be partially dissolved and partially in the solid state during mixing with the Promoter metal(s). Group VIB metal(s), and combinations thereof.

Diluent Component. The term diluent may be used interchangeably with binder. The use of diluent is optional in the making of the catalyst precursor.

In one embodiment, a diluent is included in the process for making the catalyst precursor composition. Generally, the diluent material to be added has less catalytic activity than the catalyst prepared from the catalyst precursor composition (without the diluent) or no catalytic activity at all. Consequently in one embodiment, by adding a diluent, the activity of the catalyst can be reduced. Therefore, the amount of diluent to be added in the process generally depends on the desired activity of the final catalyst composition Diluent amounts from 0-95 wt. % of the total composition can be suitable, depending on the envisaged catalytic application.

The diluent can be added to the Promoter metal component(s). Promoter metal containing mixtures. Group VIB metal(s) or metal containing mixtures either simultaneously or one after the other. Alternatively, the Promoter metal and Group VIB metal mixtures can be combined together, and subsequently a diluent can be added to the combined metal mixtures. It is also possible to combine part of the metal mixtures either simultaneously or one after the other, to subsequently add the diluent and to finally add the rest of the metal mixtures either simultaneously or one after the other. Furthermore, it is also possible to combine the diluent with metal mixtures in the solute state and to subsequently add a metal compound at least partly in the solid state. The organic oxygen containing ligand is present in at least one of the metal containing mixtures.

In one embodiment, the diluent is composited with a Group VIB metal and/or a Promoter metal, prior to being composited with the bulk catalyst precursor composition and/or prior to being added during the preparation thereof. Compositing the diluent with any of these metals in one embodiment is carried out by impregnation of the solid diluent with these materials.

Diluent materials include any materials that are conventionally applied as a diluent or binder in hydroprocessing catalyst precursors Examples include silica, silica-alumina, such as conventional silica-alumina, silica-coated alumina and alumina-coated silica, alumina such as (pseudo)boehmite, or gibbsite, titania, zirconia, cationic clays or anionic clays such as saponite, bentonite, kaoline, sepiolite or hydrotalcite, or mixtures thereof. In one embodiment, binder materials are selected from silica, colloidal silica doped with aluminum, silica-alumina, alumina, titanic, zirconia, or mixtures thereof.

These diluents can be applied as such or after peptization. It is also possible to apply precursors of these diluents that, during the process, are converted into any of the above-described diluents. Suitable precursors are, e.g., alkali metal or ammonium aluminates (to obtain an alumina diluent), water glass or ammonium- or acid-stabilized silica sols (to obtain a silica diluent), a mixture of aluminates and silicates (to obtain a silica alumina diluent), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

Other Optional Components: If desired, other materials, including other metals can be added in addition to the components described above. These materials include any material that is added during conventional hydroprocessing catalyst precursor preparation. Suitable examples are phosphorus compounds, borium compounds, additional transition metals, rare earth metals, fillers, or mixtures thereof. Suitable phosphorus compounds include ammonium phosphate, phosphoric acid, or organic phosphorus compounds. Phosphorus compounds can be added at any stage of the process steps. Suitable additional transition metals that can be added to the process steps include are, e.g., rhenium, ruthenium, rhodium, iridium, chromium, vanadium, iron, cobalt, nickel, zinc, platinum, palladium, cobalt, etc. In one embodiment, the additional metals are applied in the form of water-insoluble compounds. In another embodiment, the additional metals are added in the form of water soluble compounds. Apart from adding these metals during the process, it is also possible to composite the final catalyst precursor composition therewith the optional materials. It is, e.g., possible to impregnate the final catalyst precursor composition with an impregnation solution comprising any of these additional materials.

Methods for Making Hydroprocessing Catalyst precursor: The preparation method allows systematic varying of the composition and structure of the catalyst precursor by controlling the relative amounts of the elements, the types of the reagents, and the length and severity of the various reactions and reaction steps.

The order of addition of the reagents used in forming the catalyst precursor is not important. For example, organic oxygen containing ligand can be combined with a mixture of Promoter metal(s) and Group VIB metal(s) prior to precipitation or cogelation. The organic oxygen containing ligand can be mixed with a solution of a Promoter metal, and then added to a solution of one or more Group VIB metals. The organic oxygen containing ligand can be mixed with a solution of one or more Group VIB metals and added to a solution of one or more Promoter metals.

Forming a Precipitate or Cogel with Group VIB/Promoter Metals: In one embodiment of the process, the first step is a precipitation or cogelation step, which involves reacting in a mixture the Promoter metal component(s) in solution and the Group VIB metal component in solution to obtain a precipitate or cogel. The precipitation or cogelation is carried out at a temperature and pH which the Promoter metal compound and the Group VIB metal compound precipitate or form a cogel. An organic oxygen containing ligand in solution or at least partially in solution is then combined with the precipitate or cogel to form an embodiment of the catalyst precursor.

In an embodiment, the temperature at which the catalyst precursor is formed is between 50-150° C. If the temperature is below the boiling point of the protic liquid, such as 100° C. in the case of water, the process is generally carried out at atmospheric pressure Above this temperature, the reaction is generally carried out at increased pressure, such as in an autoclave. In one embodiment, the catalyst precursor is formed at a pressure between 0 to 3000 psig. In a second embodiment, between 100 to 1000 psig.

The pH of the mixture can be changed to increase or decrease the rate of precipitation or cogelation, depending on the desired characteristics of the product. In one embodiment, the mixture is kept at its natural pH-1 during the reaction step(s). In another embodiment, the pH is maintained in the range of 0-12. In another embodiment, between 4-10. In a further embodiment, the pH ranges between 7-10. Changing the pH can be done by adding base or acid to the reaction mixture, or adding compounds, which decompose upon temperature increase into hydroxide ions or H$^-$ ions that respectively increase or decrease the pH. Examples include urea, nitrites, ammonium hydroxide, mineral acids, organic acids, mineral bases, and organic bases.

In one embodiment, the reaction of Promoter metal component(s) is carried out with water-soluble metal salts, e.g., zinc, molybdenum and tungsten metal salts. The solution can further comprise other Promoter metal component(s), e.g., cadmium or mercury compounds such as $Cd(NO_3)_2$ or $(CH_3CO_2)_2Cd$, Group VIII metal components including cobalt or iron compounds such as $Co(NO_3)_2$ or $(CH_3CO_2)_2Co$, as well as other Group VIB metal component(s) such as chromium.

In one embodiment, the reaction of Promoter metal component(s) is carried out with water-soluble tin, molybdenum and tungsten metal salts. The solution can further comprise other Group IVA metal component(s), e.g. lead compounds such as $Pb(NO_3)_4$ or $(CH_3CO_2)_2Pb$, as well as other Group VIB metal compounds such as chromium compounds.

The reaction is carried with the appropriate metal salts resulting in precipitate or cogel combinations of zinc/molybdenum/tungsten, tin/molybdenum/tungsten, zinc/molybdenum, zinc/tungsten, tin/molybdenum, tin/tungsten, or zinc/tin/molybdenum/tungsten, or nickel/molybdenum/tungsten, cobalt/molybdenum/tungsten, nickel/molybdenum, nickel/tungsten, cobalt/molybdenum, cobalt/tungsten, or nickel/cobalt/molybdenum/tungsten. An organic oxygen containing ligand can be added prior to or after precipitation or cogelation of the Promoter metal compounds and/or Group VIB metal compounds.

The metal precursors can be added to the reaction mixture in solution, suspension or a combination thereof. If soluble salts are added as such, they will dissolve in the reaction mixture and subsequently be precipitated or cogeled. The solution can be heated optionally under vacuum to effect precipitation and evaporation of the water.

After precipitation or cogelation, the catalyst precursor can be dried to remove water. Drying can be performed under atmospheric conditions or under an inert atmosphere such as nitrogen, argon, or vacuum. Drying can be effected at a temperature sufficient to remove water but not removal of organic compounds. Preferably drying is performed at about 120° C. until a constant weight of the catalyst precursor is reached.

Forming a Precipitate with Optional Binder Component(s). In one embodiment with the use of a binder, the binder components can be added to the reaction mixture containing the metal precursors in solution, suspension or a combination thereof, forming precipitation or cogelation. The precipitate is subsequently dried to remove water.

In one embodiment with the use of magnesium aluminosilicate clay as a binder, a first reaction mixture is formed comprising a silicon component, an aluminum component, a magnesium component, the Promoter metal compounds and/or Group VIB metal compounds. In one embodiment, the first reaction mixture is formed under ambient pressure and temperature conditions. In one embodiment, the reaction is under a pressures ranging from 0.9 bar and 1.2 bar, and a temperature between about 0° C. and 100° C.

Examples of silicon components include, but are not limited to sodium silicate, potassium silicate, silica gels, silica sols, silica gels, hydronium- or ammonium-stabilized silica sols, and combinations thereof. Examples of aluminum components aluminum useful in the process of the present invention include, but are not limited to, sodium aluminate, potassium aluminate, aluminum sulfate, aluminum nitrate, and combinations thereof. Examples of magnesium components useful in the process of the present invention include, but are not limited to, magnesium metal, magnesium hydroxide, magnesium halides, magnesium sulfate, and magnesium nitrate. In one embodiment, a sufficient amount of an acid is added to the mixture containing the metal precursors and the binder components to adjust the pH of the mixture to about 1 to about 6, forming a first reaction mixture.

After the formation of the first reaction mixture, an alkali base is added to form a second reaction mixture. Examples of alkali base include, but are not limited to, ammonium hydroxide, sodium hydroxide and potassium hydroxide. Sufficient alkali base is added to the first reaction mixture for the pH of the resulting second reaction mixture between about 7 to about 12. The second reaction mixture is then reacted for sufficient time and at sufficient temperature to form a catalyst precursor incorporating at least a clay as a binder. In embodiments, the time is at least one second. In a second embodiment, 15 minutes. A third embodiment, at least 30 minutes. The temperature of the second reaction mixture can range from about 0° C. to about 100° C. The reaction can be done at ambient pressure, although higher or lower pressures are not excluded.

In one embodiment with magnesium aluminosilicate clay as a binder, the ratio of silicon to aluminum to magnesium can be expressed in terms of elemental mole ratios: aSi:bAl:cMg, wherein "a" has a value from 3 to 8. "b" has a value from 0.6 to 1.6, and "c" has a value of from 3 to 6.

Characterization of the Catalyst precursor: Characterization of the charge-neutral catalyst precursor can be performed using techniques known in the art, including, but not limited to, powder x-ray diffraction (PXRD), elemental analysis, surface area measurements, average pore size distribution, average pore volume. Porosity and surface area measurements can be performed using BJH analysis under B.E.T. nitrogen adsorption conditions.

Characteristics of the Catalyst precursor: In one embodiment, the catalyst precursor has an average pore volume of 0.05-5 ml/g as determined by nitrogen adsorption. In another embodiment, the average pore volume is 0.1-4 ml/g. In a third embodiment, 0.1-3 ml/g.

In one embodiment, the catalyst precursor has a surface area of at least 10 $m^2$/g. In a second embodiment, a surface area of at least 50 $m^2$/g. In a third embodiment, a surface area of at least 150 $m^2$/g.

In one embodiment, the catalyst precursor has an average pore size, as defined by nitrogen adsorption, of 2-50 nanometers. In a second embodiment, an average pore size of 3-30 nanometers. In a third embodiment, an average pore size of 4-15 nanometers.

In one embodiment with the inclusion of magnesium aluminosilicate clay as a binder, the catalyst precursor is a layered material composed of a stack of elemental clay platelets.

Shaping Process: In one embodiment, the catalyst precursor composition can generally be directly formed into various shapes depending on the intended commercial use. These shapes can be made by any suitable technique, such as by extrusion, pelletizing, beading, or spray drying. If the amount of liquid of the bulk catalyst precursor composition is so high that it cannot be directly subjected to a shaping step, a solid-liquid separation can be performed before shaping.

Addition of Pore forming Agents the catalyst precursor can be mixed with a pore forming agent including, but not limited to steric acid, polyethylene glycol polymers, carbohydrate polymers, methacrylates, and cellulose polymers. For example, the dried catalyst precursor can be mixed with cellulose containing materials such as methylcellulose, hydroxypropylcellulose, or other cellulose ethers in a ratio of between 100:1 and 10:1 (wt. % catalyst precursor to wt. % cellulose) and water added until a mixture of extrudable consistency is obtained. Examples of commercially available cellulose based pore forming agents include but are not limited to methocel (available from Dow Chemical Company), avicel (available from FMC Biopolymer), and porocel (available from Porocel). The extrudable mixture can be extruded and then optionally dried. In one embodiment, the drying can be performed under an inert atmosphere such as nitrogen, argon, or vacuum. In another embodiment, the drying can be performed at elevated temperatures between 70 and 200° C. In yet another embodiment, the drying is performed at 120° C.

Sulfiding Agent Component. The charge-neutral catalyst precursor can be sulfided to form an active catalyst. In one embodiment, the sulfiding agent is elemental sulfur by itself. In another embodiment, the sulfiding agent is a sulfur-containing compound which under prevailing conditions, is decomposable into hydrogen sulphide. In yet a third embodiment, the sulfiding agent is $H_2S$ by itself or $H_2S$ in $H_2$.

In one embodiment, the sulfiding agent is selected from the group of ammonium sulfide, ammonium polysulfide ($[(NH_4)_2S_x]$), ammonium thiosulfate (($NH_4)_2S_2O_3$), sodium thiosulfate $Na_2S_2O$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), and the like. In another embodiment, the sulfiding agent is selected from alkali- and/or alkaline earth metal sulfides, alkali- and/or alkaline earth metal hydrogen sulfides, and mixtures thereof. The use of sulfiding agents containing alkali- and/or alkaline earth metals can require an additional separation process step to remove the alkali- and/or alkaline earth metals from the spent catalyst.

In one embodiment, the sulfiding agent is ammonium sulfide in aqueous solution, which aqueous ammonium sulfide solution can be synthesized from hydrogen sulfide and ammonia refinery off-gases. This synthesized ammonium sulfide is readily soluble in water and can easily be stored m aqueous solution m tanks prior to use. In one embodiment wherein the sulfidation is with an aqueous ammonium sulfide solution, and also in the presence of at least a sulfur additive selected from the group of thiodazoles, thio acids, thio amides, thiocyanates, thio esters, thio phenols, thiosemicarbazides, thioureas, mercapto alcohols, and mixtures thereof.

In one embodiment, hydrocarbon feedstock is used as a sulfur source for performing the sulfidation of the catalyst precursor. Sulfidation of the catalyst precursor by a hydrocarbon feedstock can be performed in one or more hydrotreating reactors during hydrotreatment.

In one embodiment, the sulfiding agent is present in an amount in excess of the stoichiometric amount required to form the sulfided catalyst from the catalyst precursor. In another embodiment, the amount of sulfiding agent represents a sulphur to Group VIB metal mole ratio of at least 3 to 1 to produce a sulfided catalyst from the catalyst precursor. In a third embodiment, the total amount of sulfur-containing compound is generally selected to correspond to any of about 50-300%, 70-200%, and 80-150%, of the stoichiometric sulfur quantity necessary to convert the metals into for example, $CO_9S_8$, $MoS_2$, $WS_2$, $Ni_3S_2$, etc.

Sulfiding Step: Sulfiding (sometimes referred to as "pre-sulfiding") of the catalyst precursor to form the catalyst can be performed prior to introduction of the catalyst into a hydrotreating reactor (thus ex-situ sulfiding). In another embodiment, the sulfiding is in-situ. In one embodiment with the sulfiding process being done ex-situ, the formation of undesirable compounds in the hydrotreating unit is prevented. In one embodiment, the catalyst precursor is converted into an active catalyst upon contact with the sulfiding agent at a temperature ranging from 70° C. to 500° C., from 10 minutes to 15 days, and under a $H_2$-containing gas pressure. If the sulfidation temperature is below the boiling point of the sulfiding agent, such as 60-70° C. in the case of ammonium sulphide solution, the process is generally carried out at atmospheric pressure. Above the boiling temperature of the sulfiding agent/optional components, the reaction is generally carried out at an increased pressure.

In one embodiment, the sulfiding can be carried out in the gaseous phase with hydrogen and a sulfur-containing compound which is decomposable into $H_2S$ Examples include mercaptanes, $CS_2$, thiophenes. DMS, DMDS and suitable S-containing refinery outlet gasses. The use of $H_2S$ alone is sufficient. The contacting between the catalyst precursor in gaseous phase with hydrogen and a sulfur-containing compound can be done in one step at a temperature between 125° C. to 450° C. (257° F. to 842° F.) in one embodiment, and between 225° C. to 400° C. (437° F. to 752° F.) in another embodiment. In one embodiment, the sulfidation is carried out over a period of time with the temperature being increased in increments, e.g., from 0.5 to 4° C. (0.9 to 7.2° F.) per min, and held over a period of time, e.g., from 1 to 12 hours, until completion.

As used herein, completion of the sulfidation process means that at least 95% of stoichiometric sulfur quantity necessary to convert the metals into for example, $CO_9S_8$, $MoS_2$, $WS_2$, $Ni_3S_2$, etc., has been used up.

In another embodiment of sulfidation in the gaseous phase, the sulfidation is done in two or more steps, with the first step being at a lower temperature than the subsequent step(s). For example, the first step is at about 100 to 250° C. (212° F. to 482° F.), preferably about 125 to 225° C. (257° F. to 437° F.). After a short period of time, e.g., from ½ to 2 hours (temperature kept at a plateau). The second step can be carried out at about 225 to 450° C. (437° F. to 842° F.), and preferably about 250 to 400° C. (482° F. to 752° F.). The total pressure during the sulfidation step can be between atmospheric and about 10 bar (1 MPa). The gaseous mixture of $H_2$ and sulfur containing compound can be the same or different in the steps. The sulfidation in the gaseous phase can be done in any suitable manner, including a fixed bed process and a moving bed process (in which the catalyst moves relative to the reactor, e.g., ebullated process and rotary furnace).

In one embodiment, the sulfidation is carried out in the liquid phase. At first, the catalyst precursor is brought in contact with an organic liquid in an amount in the range of 20-500% of the catalyst precursor pore volume. The contacting with the organic liquid can be at a temperature ranging from ambient to 250° C. (482° F.). After the incorporation of an organic liquid, the catalyst precursor is brought into contact with hydrogen and a sulfur-containing compound.

In one embodiment, the organic liquid has a boiling range of about 100-550° C. (212-1022° F.). In another embodiment, the organic liquid is a petroleum fraction such as heavy oils, lubricating oil fractions like mineral lube oil, atmospheric gas oils, vacuum gas oils, straight run gas oils, white spirit, middle distillates like diesel, jet fuel and heating oil, naphthas, and gasoline. In one embodiment, the organic liquid contains less than 10 wt. % sulfur, and preferably less than 5 wt %.

In one embodiment, the sulfidation (or "start-up") in the liquid phase is done as a "quick" process, with the sulfidation taking place over a period of less than 72 hours and with the ramp-up in temperature ranges from 0.5 to 4° C. (0.9 to 7.2° F.) per min. In a second embodiment, the quick start-up takes less than 48 hours. In a third embodiment, less than 24 hours.

In the quick sulfidation, the contacting between the catalyst precursor in organic liquid with hydrogen and a sulfur-containing compound can be done in one step at a temperature between 150 to 450° C. in one embodiment, and between 225° C. to 400° C. in another embodiment. In yet another embodiment of the quick sulfidation, the sulfidation is done in two or more steps, with the first step being at a lower temperature than the subsequent step(s). For example, the first step is at about 100 to 250° C. (212° F. to 482° F.), or from 125 to 225° C. (257° F. to 437° F.). After a short period of time, e.g., from ½ to 2 hours (temperature kept at a plateau), then the temperature is ramped up for the second step, e.g., from 250 to 450° C. (482° F. to 842° F.), and preferably from 225 to 400° C. (437° F. to 7520° F.). The temperature is maintained from 1 to 36 hours, after which time sulfidation is complete.

In yet another embodiment, the sulfidation in the liquid phase is done as a "slow" process, with the sulfidation taking place over a period of time from four (4) days up to three weeks, i.e., at least 96 hours. In this slow process, the contacting between the catalyst precursor in organic liquid with hydrogen and a sulfur-containing compound is done in two or more steps, with the first step being at a lower temperature than the subsequent step(s) and with the temperature being increased slowly in increments, e.g., per hour instead of per minute as in the quick start up. The gaseous mixture of $H_2$ and sulfur containing compound can be the same or different m the steps. In one embodiment, the first step is at about 100 to 375° C. (212° F. to 707° F.), preferably about 125 to 350° C. (257° F. to 662° F.), with a temperature ramp rate from 0.25 to 4° C. (0.45 to 7.2° F.) per hour. After the first step, temperature is held constant for a period of time from 2 to 24 hours, then ramped up for the second step at a rate from 5 to 20° C. (9 to 36° F.) per hour. In one embodiment, the second step is carried out at about 200 to 450° C. (392° F. to 842° F.), and preferably about 225 to 400° C. (437° F. to 752° F.).

In one embodiment, the sulfiding is done with elemental sulfur, wherein the sulfur is incorporated into the pores of the catalyst precursors. In this process, elemental sulfur is mixed with the catalyst precursor in an amount from 2 to 15 wt. % of the catalyst precursor weight, at a temperature below the melting point of sulfur. In one embodiment, the mixing is at 180 to 210° F. (82° to 99° C.). Sequentially or simultaneously with the mixing of precursor and elemental sulfur, the mixture is brought into contact with a high boiling organic liquid. The mixture is then heated to a temperature in the range of 250 to 390° F. (121° to 199° C.) in the presence of nitrogen, producing $H_2S$ and metal sulfides. In one embodiment, the organic liquid is selected from the group consisting of olefins, gasoline, white spirit, diesel, gas oils, mineral lube oils, and white oils.

In one embodiment, it is found that catalysts sulfided from embodiments of the catalyst precursors surprisingly give about the same 700° F.+conversion rate whether sulfided via the gaseous phase, or in the liquid phase as a "quick" process. In one embodiment, it is found that the 700° F.+conversion increases at least 25% with the use of catalysts sulfided in the liquid phase and via the "slow" process. In yet another embodiment, the 700° F.+conversion doubles with a catalyst sulfided via the slow process.

A preferred catalyst precursor is the Ni—Mo—W maleate catalyst precursor. The catalyst is preferably sulfided with dimethyl sulfide (DMDS).

The amount of the present catalyst used in first (and top) reaction zone of the second stage can vary. The catalyst can comprise 100% of the catalyst in the stage, or it can be mixed with conventional hydrocracking catalysts. Generally at least 40% of the catalyst is the present catalyst, more preferably at least 60 wt %. However, from 90-100% is preferred. Overall, in general, the present catalyst comprises from about 10 to 30 wt % of all the hydrocracking catalyst in the second stage (hydrocracking reactor).

Further understanding can be achieved upon a review of the figures of the drawing and the following examples.

FIG. 1, in one embodiment, depicts a two-stage hydrocracking system for running the present process. This operation is mostly hydrogenating the feed to remove most of the heteroatoms in a first stage reactor. Subsequently, the effluent is passed to the second reactor with a focus more exclusively on hydrocracking the feed boiling range into transportation fuel boiling range. The hydrocracked products are then passed to a distillation column. Recycle is possible to the first stage or second stage. The most refractory compounds left unconverted in the second stage would accumulate in the recycle loop if it were not for a bleed to e.g. an FCC unit.

FIGS. 2A-F show an optional control aspect of the present process. To assure that a two-stage-recycle run does not fail catastrophically by refractory compounds settling out in the recycle loop, the color and polycyclic aromatic index (PCI) are regularly monitored and maintained within an acceptable range bleeding part of the recycle stream.

Figure 3:
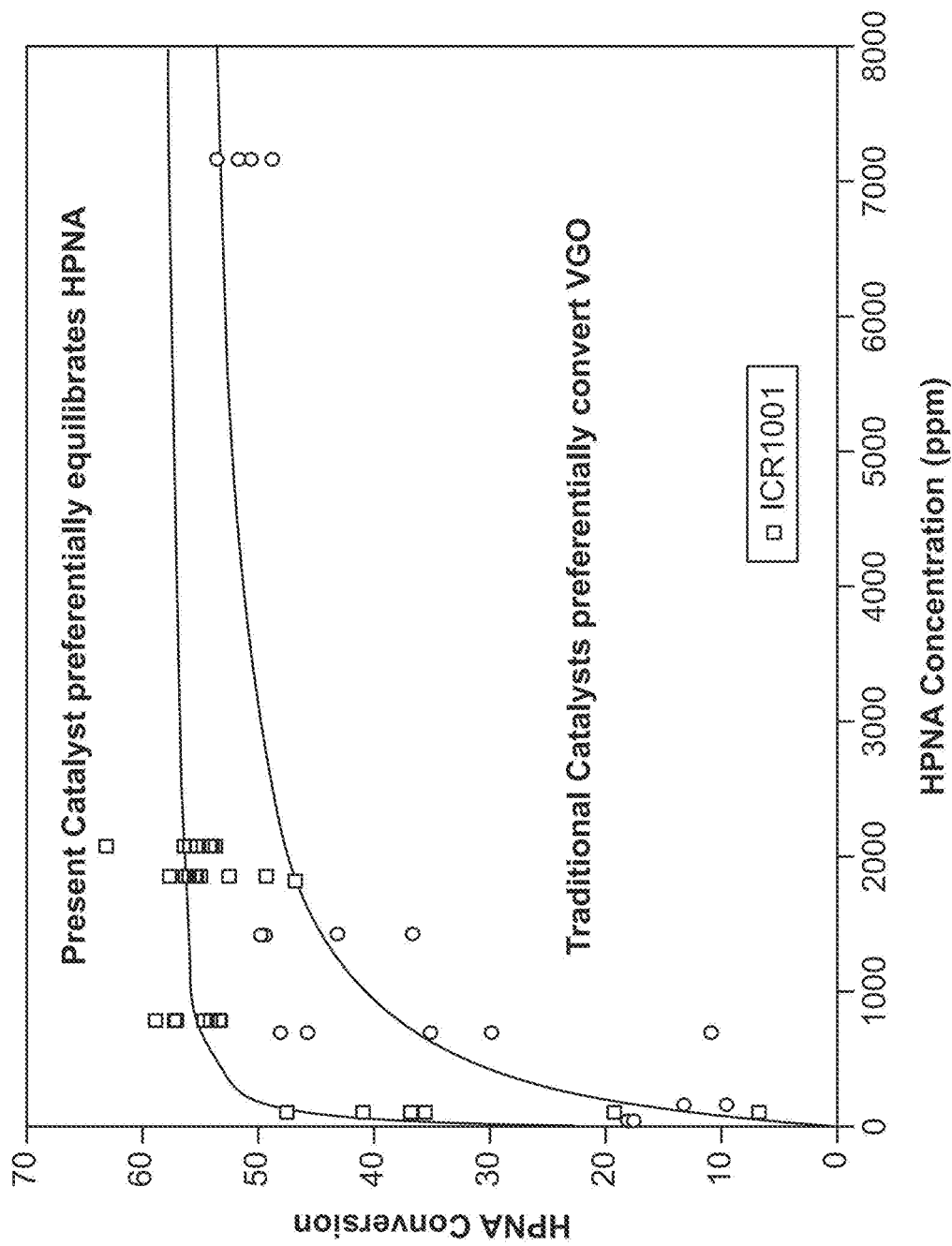
FIG. 3 graphically shows how the present catalyst system focuses on hydrogenating heavy polynuclear aromatics first, in contrast to conventional catalyst systems.

FIG. 3 graphically shows that traditional hydrotreating catalyst systems first hydrotreat the bulk of the vacuum gas oil (VGO) solvent and only start bringing the heavy polynuclear aromatics (HPNA's) solute to hydrogenation equilibrium when this solute is at appreciable concentrations. By contrast, hydrotreating catalyst systems with sufficient focus at hydrogenating the HPNA solute first.

Figure 4:
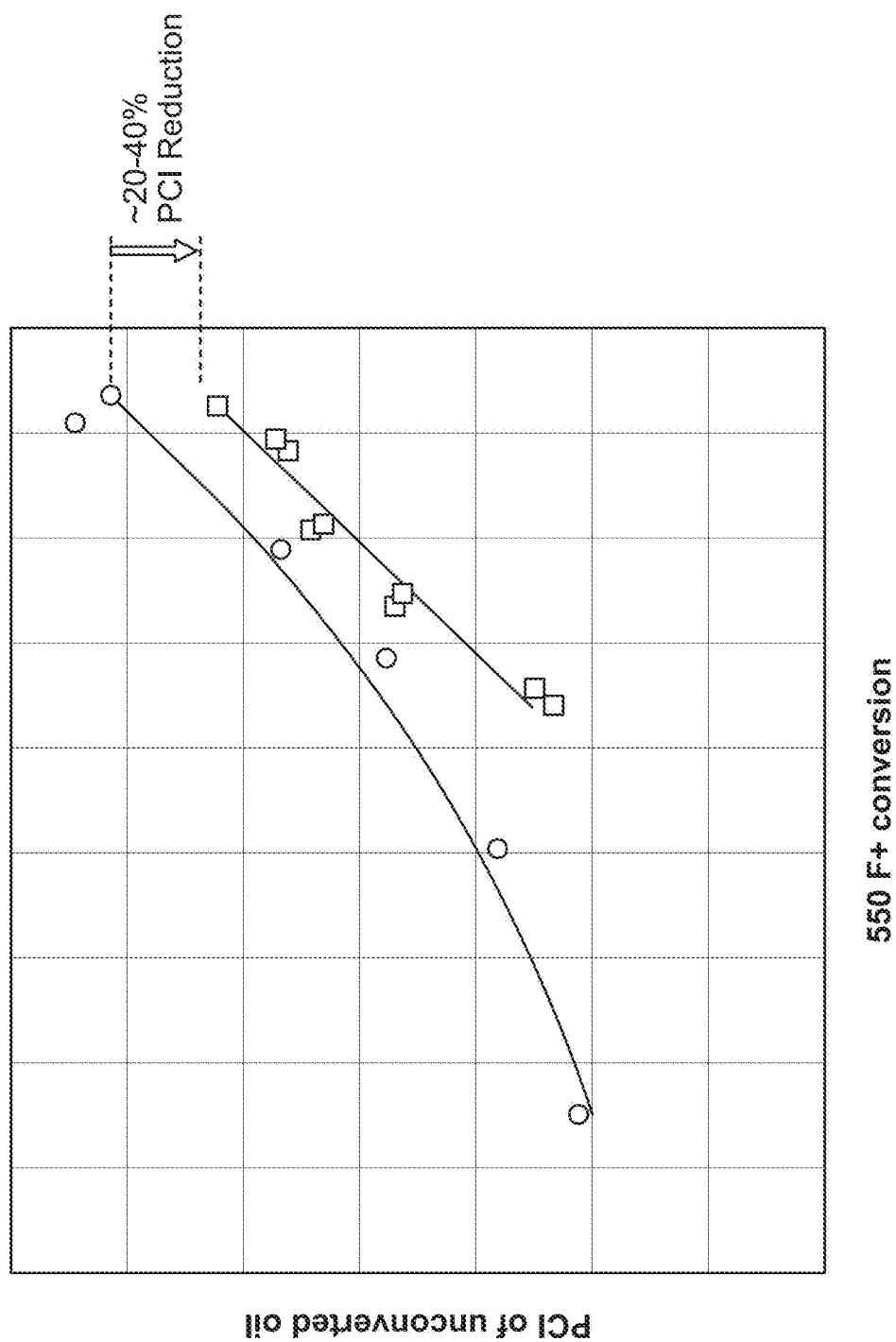
FIG. 4 graphically shows the PCI reduction when using the present catalyst system.

FIG. 4 graphically shows that typical catalyst systems hydrocrack the high-boiling vacuum gas oil (VGO) solvent into a lower transportation fuel range, which concentrates the refractory sediment precursors in the unconverted oil.

Hydrocracking systems containing the present catalyst convert some of the sediment precursors, which results in a lower Polynuclear aromatics Index or PCI.

FIGS. 5A-D show that hydrodesulfurization of an atmospheric residual gas oil (ARDS) yields a vacuum gas oil (VGO) that contains less sulfur (see Table 1) as compared a straight run (SR) VGO, but that also exhibits less molecular diversity. This is shown for both the aromatics, FIG. 5A vs. 5C, and the resin fraction, FIG. 5B vs. 5D, as harvested by liquid chromatography (ASTM D2007).

Figures 6A, 6B:
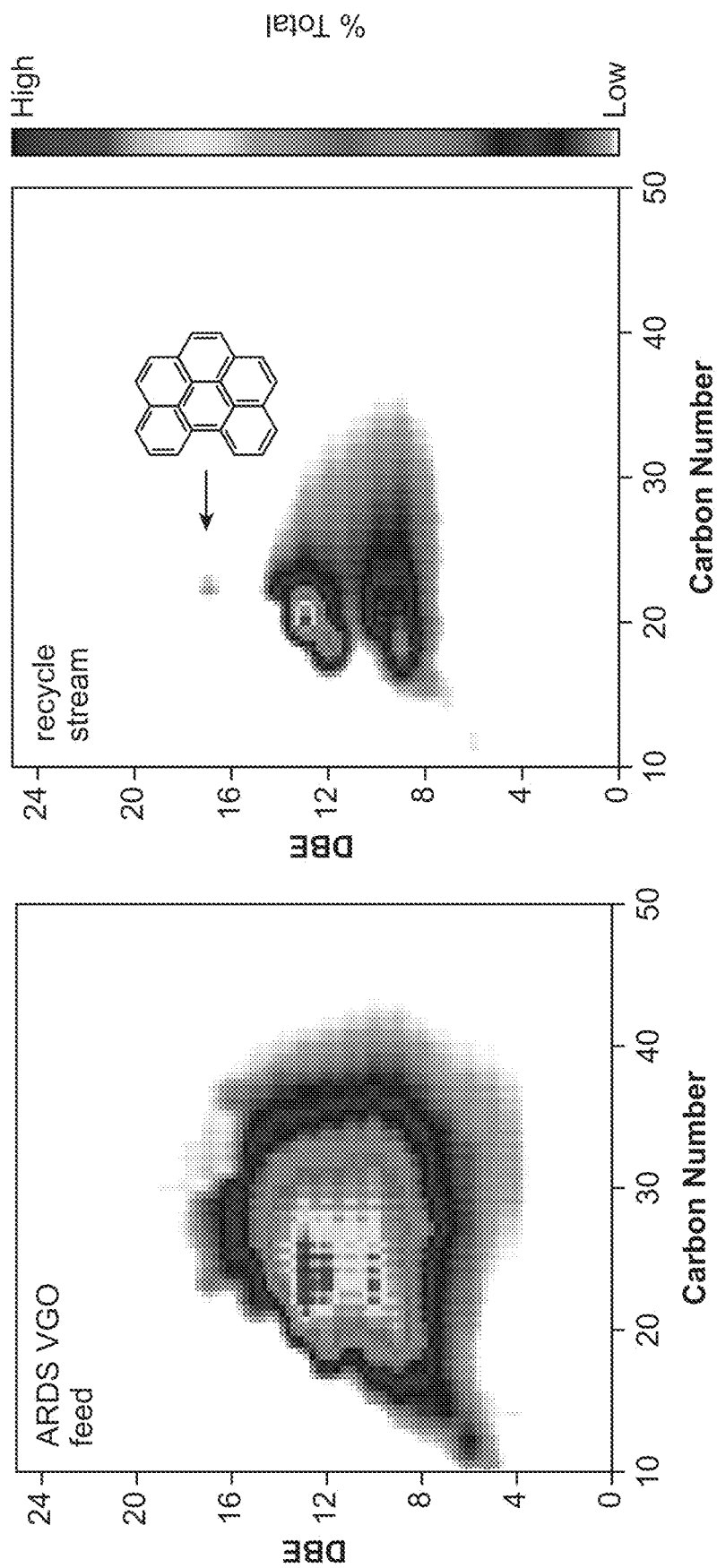
FIG. 6 shows the carbon number (CN) and double bond equivalents (DBE) of the feed in FIG. 6A and recycle stream in FIG. 6B using high-resolution mass spectrometry.
Figure 7:
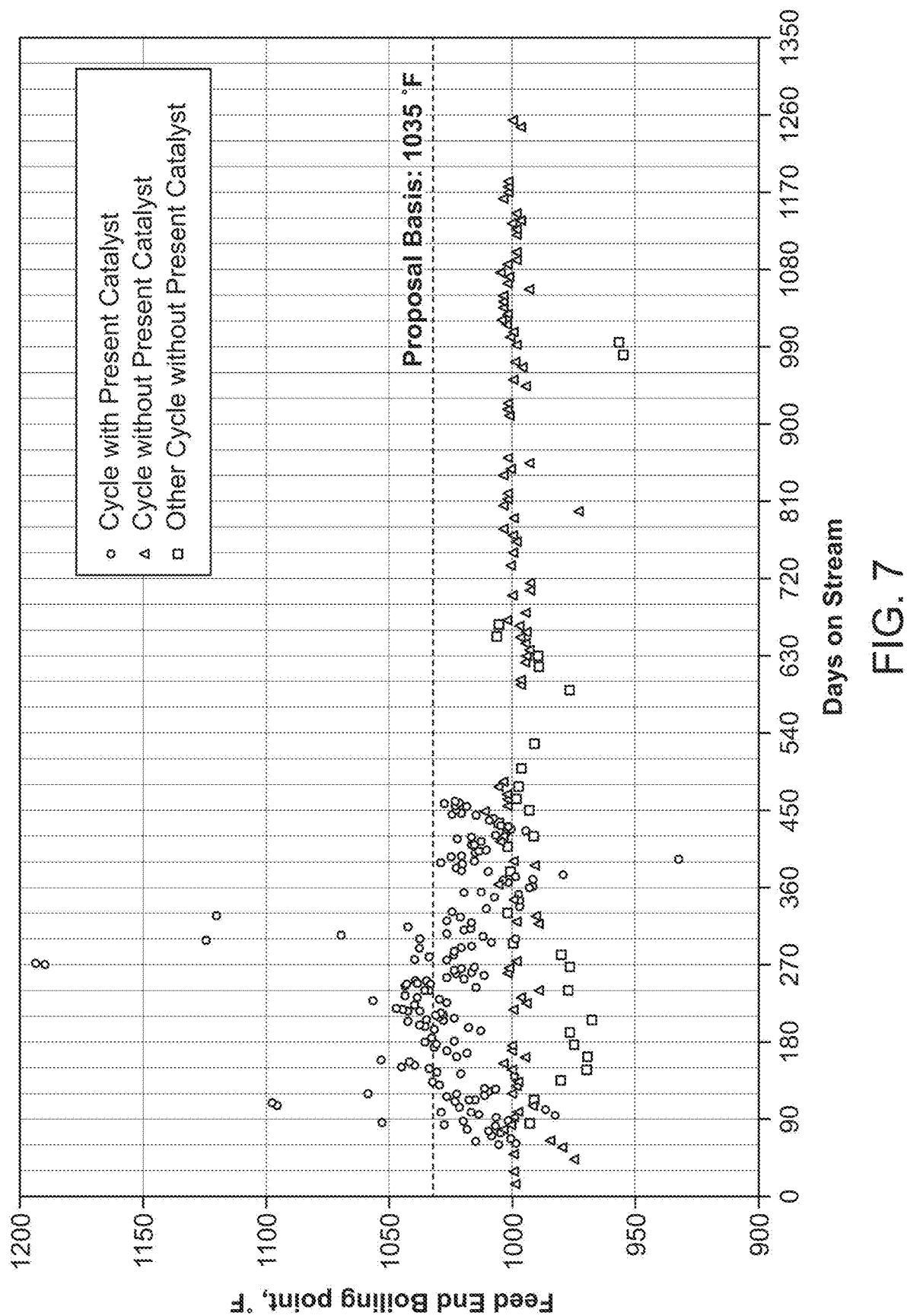
FIG. 7 graphically shows that a cycle with the present catalyst system is more accommodating so that it can deploy a higher feed end boiling point.
Figure 8:
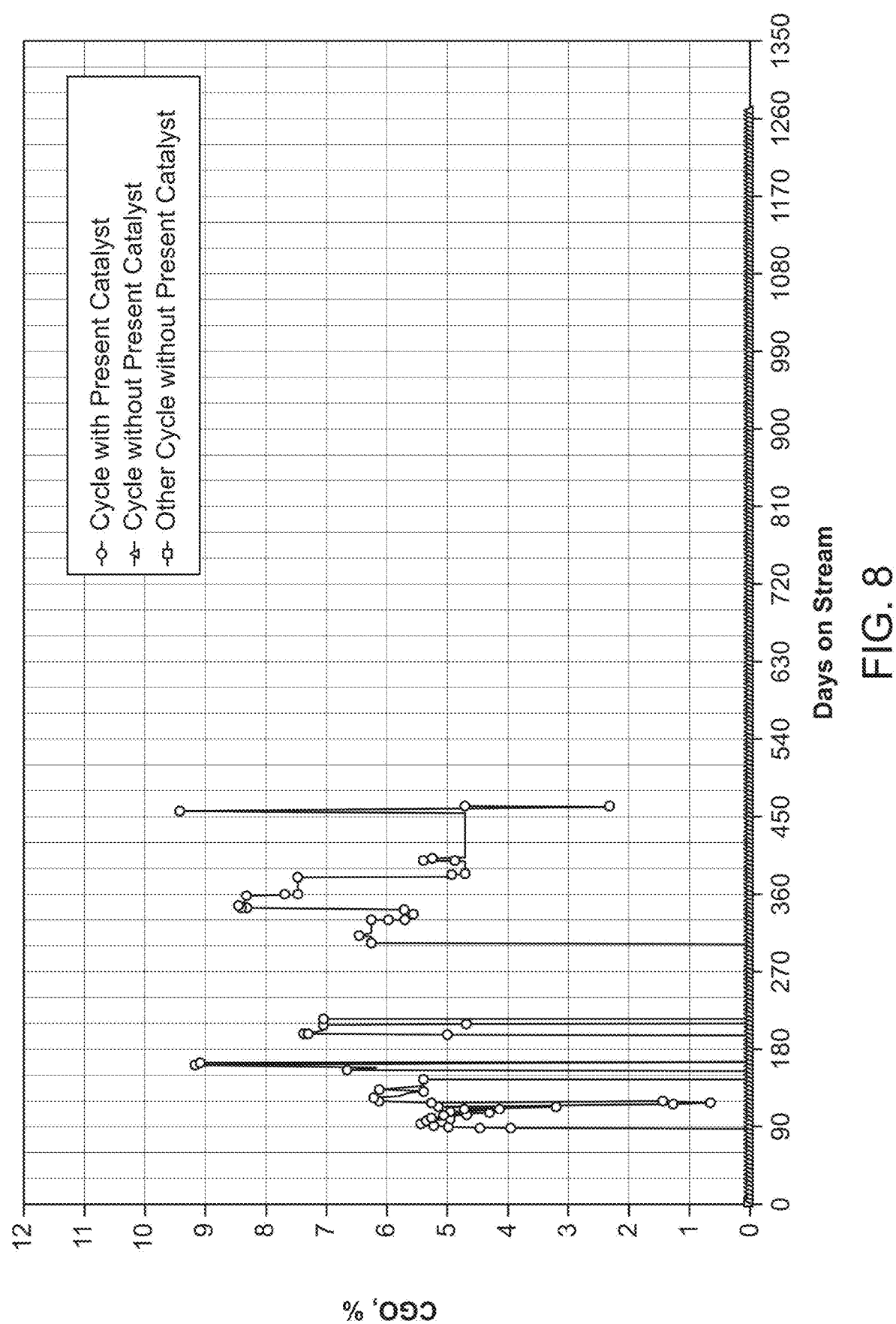
FIG. 8 graphically shows that the present catalyst system is more accommodating so that the CGO content of the feed can be increased.
Figure 9:
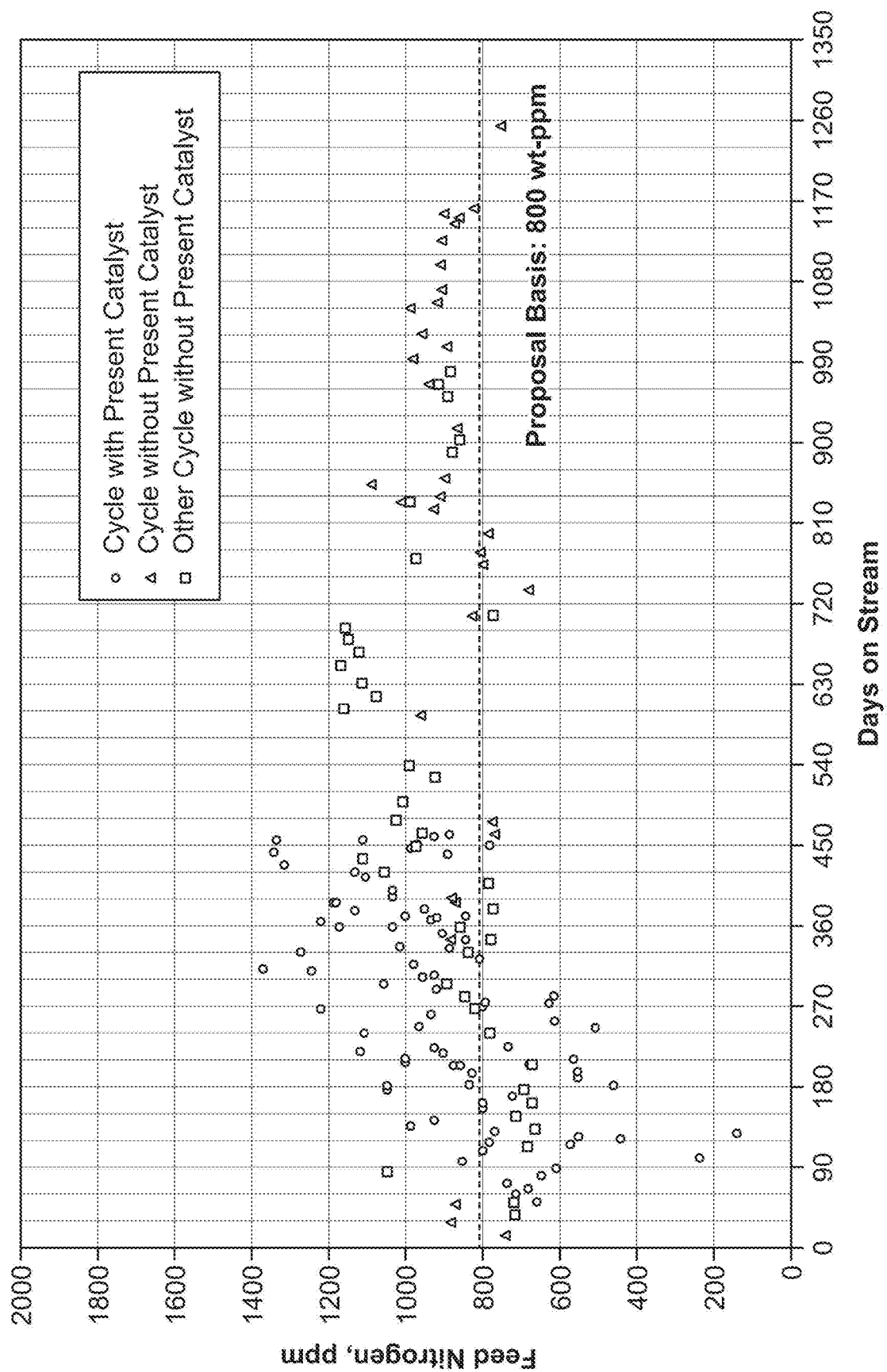
FIG. 9 graphically shows an increase in organic feed nitrogen content, consistent with the increase in end point as compared to the prior cycle.
Figure 10:
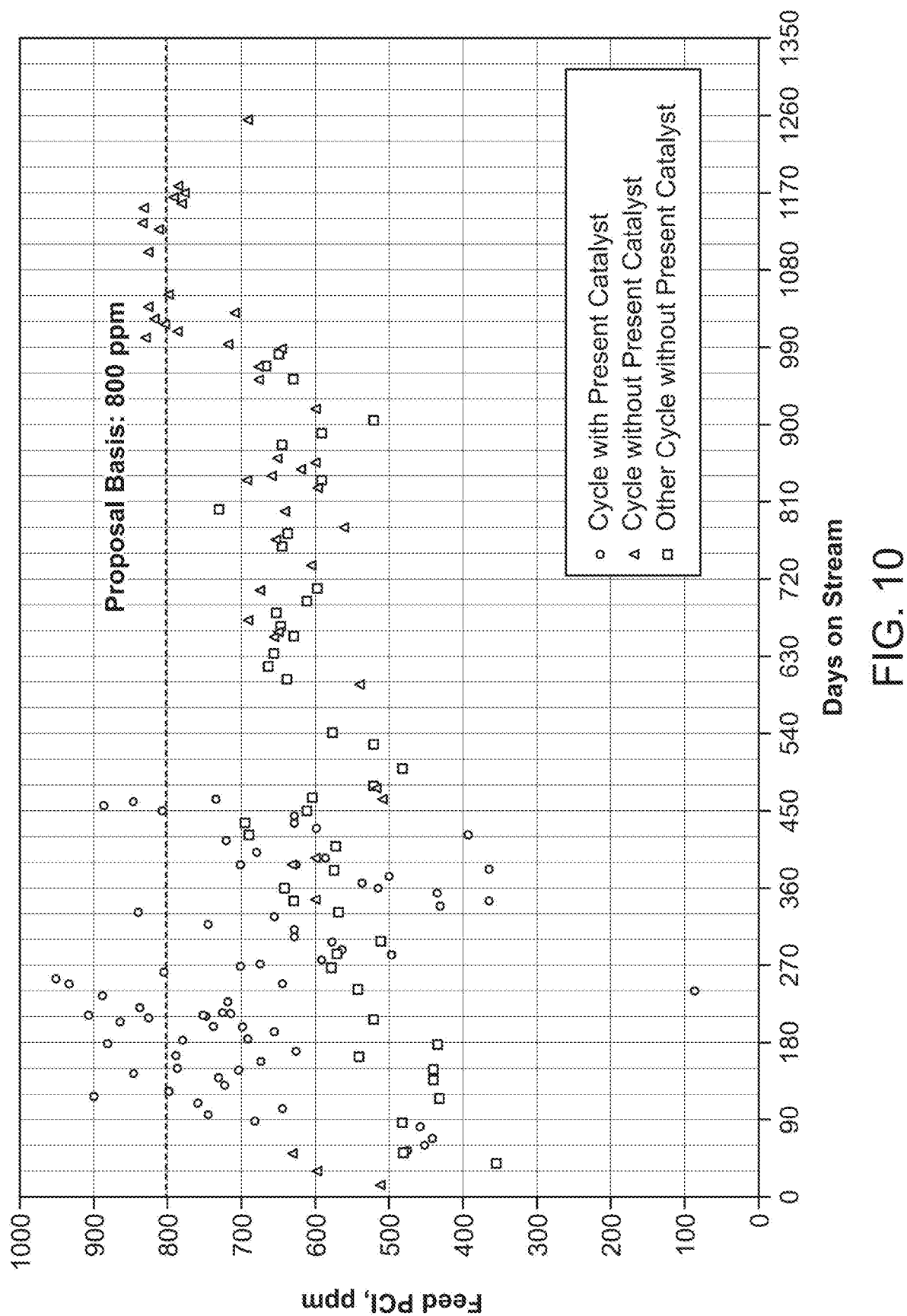
FIG. 10 graphically shows an increase in the PCI of the feed.

Monitoring the ARDS VGO feed and the unconverted oil recycle stream in two-stage recycle hydrocracking operation with high-resolution mass spectrometry yields graphs that show carbon number (or CN) and Double Bond Equivalent (or DBE). DBE is a measure for the hydrogen deficiency of a molecule and equates to the number of rings plus double bonds. It highlights how methyl-benzo(g,h,i)perylene and of benzo(g,h,i)perylene (CN=22, DBE=17 and CN=23, DBE=17) accumulate in the aromatics fraction (harvested by ASTM D2007), because these are the species most thermodynamically stable at the operating conditions of the commercial two-stage-recycle hydrocracker. This is shown in FIG. 6A for the feed and FIG. 6B for the recycle.

Hydrocracker Unit Configuration

More specifically, in one embodiment, FIG. 1 shows an embodiment using a two-stage hydrocracker unit with recycle. The two-stage hydrocracking system shown has a distillation column 1 after the first stage (hydrogenation or hydrotreating stage) 2 and the second stage (hydrocracking stage) 3. Petroleum feed is fed 4 to the first stage with hydrogen 5 to effect hydrogenation. Four beds are shown in the hydrotreating stage, but the number can vary. The hydrogenation removes most of the heteroatoms. Hydrotreated effluent 6 is then fed to the second or hydrocracking stage 3, which also contains a number of superimposed catalyst beds containing hydrocracking catalyst or catalysts. The number of zones or beds can vary. The first reaction zone, the top reaction zone, comprises the present catalyst. It is important the present catalyst is in this position to effect good sedimentation disruption. More than one type of hydrocracking catalyst may be used, depending upon the hydrocracking functionality required in this reactor 3. The bottom bed. 7, frequently contains a catalytically effective amount of a desulfurization catalyst for more effective desulfurization with the objective of lowering the temperature to inhibit formation of mercaptans and of converting any recombinant mercaptans to inorganic sulfur. The hydrocracked effluent 8 is then fed to the distillation column 1. Lighter products are recovered and the bottoms 9 can be recycled to either the first stage or the second stage.

The recycle to the second stage can be directly to the second stage or can be first combined with the hydrotreated effluent as shown. A bleed of the bottoms 10 is also preferably sent to a FCC feed.

Feedstocks

A wide range of petroleum and chemical feedstocks can be hydroprocessed in accordance with the present process. Suitable feedstocks include whole and reduced petroleum crudes, atmospheric and vacuum residua, propane deasphalted residua, e.g., brightstock, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes. Fischer-Tropsch waxes, raffinates, naphthas, and mixtures of these materials. Typical lighter feeds would include distillate fractions boiling approximately from about 175° C. (about 350° F.) to about 375° C. (about 750° F.). With feeds of this type a considerable amount of hydrocracked naphtha is produced which can be used as a low sulfur gasoline blend stock. Typical heavier feeds would include, for example, vacuum gas oils boiling up to about 593° C. (about 1100° F.) and usually in the range of about 350° C. to about 500° C. (about 660° F. to about 935° F.) and, in this case, the proportion of diesel fuel produced is correspondingly greater.

In one embodiment, the process is operated by conducting the feedstock, which generally contains high levels of sulfur and nitrogen, to the initial hydrotreatment reaction stage to convert a substantial amount of the sulfur and nitrogen in the feed to inorganic form with a major objective in this step being a reduction of the feed nitrogen content. The hydrotreatment step is carried out in one or more reaction zones (catalyst beds), in the presence of hydrogen and a hydrotreating catalyst. The conditions used are appropriate to hydrodesulfurization and/or denitrogenation depending on the feed characteristics. The product stream is then passed to the hydrocracking stage in which boiling range conversion is effected. In the present two-stage system, the stream of liquid hydrocarbons from the first hydroconversion stage together with hydrogen treat gas and other hydrotreating/hydrocracking reaction products including hydrogen sulfide and ammonia, preferably passes to separators, such as distillation column, in which hydrogen, light ends, and inorganic nitrogen and hydrogen sulfide are removed from the hydrocracked liquid product stream. The recycle hydrogen gas can be washed to remove ammonia and may be subjected to an amine scrub to remove hydrogen sulfide in order to improve the purity of the recycled hydrogen and so reduce product sulfur levels. In the second stage the hydrocracking reactions are completed. A bed of hydrodesulfurization catalyst, such as a bulk multimetallic catalyst, may be provided at the bottom of the second stage.

Hydrotreating Catalysts

Conventional hydrotreating catalysts for use in the first stage may be any suitable catalyst. Typical conventional hydrotreating catalysts for use in the present invention includes those that are comprised of at least one Group VIII metal, preferably Fe. Co or Ni, more preferably Co and/or Ni, and most preferably Co; and at least one Group VIB metal, preferably Mo or W, more preferably Mo, on a relatively high surface area support material, preferably alumina. Other suitable hydrodesulfurization catalyst supports include zeolites, amorphous silica-alumina, and titania-alumina Noble metal catalysts can also be employed, preferably when the noble metal is selected from Pd and Pt. More than one type of hydrodesulfurization catalyst be used in different beds in the same reaction vessel. The Group VIII metal is typically present in an amount ranging from about 2 to about 20 wt. %, preferably from about 4 to about 12 wt. %. The Group VIB metal will typically be present in an amount ranging from about 5 to about 50 wt. %, preferably from about 10 to about 40 wt. %, and more preferably from about 20 to about 30 wt. % All metals weight percents are on support (percents based on the weight of the support).

Hydrocracking Catalysts

Examples of conventional hydrocracking catalysts which can be used in the lower reaction zones of the second stage, i.e., the hydrocracking stage, include nickel, nickel-cobalt-molybdenum, cobalt-molybdenum and nickel-tungsten and/or nickel-molybdenum, the latter two which are preferred. Non-limiting examples of noble metal catalysts include those based on platinum and/or palladium. Porous support materials which may be used for both the noble and non-noble metal catalysts comprise a refractory oxide material such as alumina, silica, alumina-silica, kieselguhr, diatomaceous earth, magnesia, or zirconia, with alumina, silica, alumina-silica being preferred and the most common. Zeolitic supports, especially the large pore faujasites such as USY can also be used.

A large number of hydrocracking catalysts are available from different commercial suppliers and may be used according to feedstock and product requirements: their functionalities may be determined empirically. The choice of hydrocracking catalyst is not critical. Any catalyst with the desired hydroconversion functionality at the selected operating conditions can be used, including conventional hydrocracking catalysts.

By the present process, a difficult problem is effectively overcome by using the specified catalyst of the process in the specified position of a two-stage hydrocracking system. The problem of sedimentation is addressed. Sedimentation of molecules that have become incompatible with the gas oil as it is being hydroprocessed is a particularly acute problem in hydrocrackers running in a two-stage recycle process (FIG. 1). Recycle operation augments the impact of incompatibility because this operation concentrates the polycyclic aromatic solute by hydrocracking the solvent into transportation fuels, and by distilling these fuels away as products. This concentrates the already not overly compatible aromatic solute, and concentration further enhances the risk of bringing the aromatic solute well above its solubility limit. The associated risk of a catastrophic seizure of the run through sedimentation inside the recycle loop is well known. Sedimentation is typically controlled by carefully monitoring the recycle loop for the buildup of sediment-forming heavy aromatics and by bleeding the appropriate fraction of unconverted oil to keep these aromatics under their solubility limit. There are several monitoring options: i) by color, visually; ii) by UV Vis spectroscopy from which one can derive a PolyCyclic aromatic Index (or PCI, a marker for incompatibility risk); iii) by spot checking the buildup of aromatic compounds with high-resolution mass spectrometry (FIGS. 2A-F). This reactive approach to mitigating incompatible aromatics accumulation generates a low-value bleed stream of unconverted oil, which misses an opportunity to hydroprocess this oil into high-value transportation fuel (FIG. 1). The present process offers an effective and more proactive approach that mitigates the risk of the buildup of incompatible compounds before it gets started. This proactive approach offered by the present process minimizes the bleed stream and commensurately improves the production rate of transportation fuel without a major impact on run length.

One can proactively counteract sedimentation by selectively keeping the polycyclic aromatics in the hydroprocessing streams at their hydrogenation equilibrium before they have an opportunity to agglomerate, to emulsify or to become recalcitrant to hydroprocessing in other ways. Since the incompatible large aromatic compounds agglomerate already at low concentrations and since they boil toward and above the tail end of typical hydrocracker feedstock boiling range, traditional hydrotreating catalysts focus at saturation of the majority of the feedstock (the solvent) and do not start to saturate the low concentration of polycyclic aromatics (the solute) until it has built up to appreciable (and undesirable) levels (FIGS. 3 and 4). In marked contrast, the unique pore structure and high hydrogenation activity of the present self-supported multi-metallic catalyst prepared from a precursor in hydroxide form affords it to selectively target the polycyclic aromatics even at concentration well below the level at which they start to agglomerate. A comparison of the efficacy of a catalyst system with the present specific catalyst as compared to a typical catalyst system illustrates the selective hydrogenation of a representative polycyclic aromatic compound doped into a typical vacuum gas oil of middle eastern pedigree (FIG. 3). Another illustration is the significant reduction of PCI (a marker for incompatibility risk) by adding the present catalyst to a catalyst system deployed to hydroprocess a vacuum gas oil (VGO) feed derived nearly exclusively from atmospheric residue desulfurization (ARDS) in once-through operation (FIG. 4). The most powerful illustration is what happens when this concept is taken into practice at a commercial hydrocracker that hydroprocesses ARDS VGO in two-stage recycle operation (FIG. 1).

Interestingly the bulk properties (more saturated, lower boiling range) of ARDS VGO suggest that it should be significantly more amenable to hydroprocessing than a typical straight-run (SR) VGO (see Table below), whereas the exact opposite is true in that ARDS VGO is significantly more recalcitrant to hydroprocessing.

TABLE 1

Typical physical properties suggest that a vacuum gas oil (VGO) derived from an atmospheric residual oil hydrodesulfurization (ARDS) unit is more saturated and should hydroprocess with more ease than a straight run VGO, whereas the reverse is true.

|  | SR VGO | ARDS VGO |
| --- | --- | --- |
| Saturates (wt-%) | 50 | 54 |
| Aromatics (wt-%) | 44 | 42 |
| Resins (wt-%) | 6 | 4 |
| API | 21.7 | 24.9 |
| S (ppm) | 22056 | 5654 |
| N (ppm) | 996 | 915 |
| H by NMR (wt-%) | 12.26 | 12.52 |
| PCI | 2293 | 791 |
| MCRT | 0.29 | 0.05 |
| HHA* (ppm) | 67 | 127 |
| SimDist (wt-%) F |  |  |
| 0.5 | 624 | 595 |
| 5 | 689 | 680 |
| 10 | 723 | 710 |
| 30 | 793 | 775 |
| 50 | 845 | 825 |
| 70 | 899 | 880 |
| 90 | 979 | 950 |
| 95 | 1018 | 975 |
| 99 | 1092 | 1035 |

Mass spectrometry of the aromatics and of the resin fractions (harvested by ASTM D2007) indicates that the prior hydrodesulfurization has created a (ARDS) VGO that is significantly more homogeneous and less diverse (FIGS. 5C and D) as compared to a typical Middle Eastern (SR) VGO (FIGS. 5A and B). Even though the individual aromatic molecules in the ARDS VGO hydrogen deficiency range are themselves not refractory (molecules become refractory for DBE≥17, i.e. for benzo(g,h,i) perylene and aromatics with higher hydrogen deficiency), a high concentration of denuded aromatic cores will be prone to assemble into a separate, dispersed liquid phase. In the resultant nano-emulsion the aromatic dispersed liquid phase will not easily compete for adsorption and reaction with the continuous liquid phase. High resolution mass spectrometry shows that this lack of diversity leads to the buildup of denuded aromatic cores (particularly (methylated) benzo(g,h,i) perylene) in the aromatics fraction of the recycle loop (FIG. 6B).

EXAMPLES

The Catalyst

The following illustrative examples are intended to be non-limiting.

Example 1

Ni—Mo—W-Maleate Catalyst Precursor

A catalyst precursor of the formula $(NH_4)\{[Ni_{2.6}(OH)_{2.08}(C_4H_2O_4^{2-})_{0.06}](Mo_{0.35}W_{0.65}O_4)_2\}$ was prepared as follows: 52.96 g of ammonium heptamolybdate $(NH_4)_6Mo_7O_{24}.4H_2O$ was dissolved in 2.4 L of deionized water at room temperature. The pH of the resulting solution was within the range of 5-6. 73.98 g of ammonium metatungstate powder was then added to the above solution and stirred at room temperature until completely dissolved 90 ml of concentrated $(NH_4)OH$ was added to the solution with constant stirring. The resulting molybdate/tungstate solution was stirred for 10 minutes and the pH monitored. The solution had a pH in the range of 9-10. A second solution was prepared containing 174.65 g of $Ni(NO_3)_2.6H_2O$ dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was m the range of 5-6. A blue-green precipitate formed and the precipitate was collected by filtration. The precipitate was dispersed into a solution of 10.54 g of maleic acid dissolved in 1.8 L of DI water and heated to 70° C. The resulting slurry was stirred for 30 min. at 70° C., filtered, and the collected precipitate vacuum dried at room temperature overnight. The material was then further dried at 120° C. for 12 hr. The resulting material has a typical XRD pattern with a broad peak at 2.5 Å, denoting an amorphous Ni—OH containing material. The BET Surface area of the resulting material was 101 $m^2/g$, the average pore volume was around 0.12-0.14 cc/g, and the average pore size was around 5 nm.

Example 2

Co—Mo—W-Maleate Catalyst Precursor

A catalyst precursor of the formula $(NH_4)\{[Co_{3.0}(OH)_{3.0-c}(C_4H_2O_4^{2-})_{c/2}](Mo_{0.34}W_{0.66}O_4)_2\}$ was prepared as follows: 2.0 g of maleic acid was dissolved in 800 g of deionized water at room temperature. The pH of the resulting solution was within the range of 2-3. 17.65 g of ammonium heptamolybdate $(NH_4)_6Mo_7O_{24}.4H_2O$ powder was dissolved in the above solution, followed by addition of 24.67 g of ammonium metatungstate $(NH_4)_6H_2W_{12}O_{40}.xH_2O$ (>66.5% W). The pH of the resulting solution was within the range of 4-5. 30 ml of concentrated $(NH_4)OH$ was added to the solution with constant stirring. The resulting molybdate/tungstate solution was stirred for 10 minutes and the pH monitored. The solution had a pH in the range of 9-10 at room temperature and was heated to 90° C. A second solution was prepared containing 58.28 g of cobalt nitrate dissolved in 50 g of deionized water. The hot cobalt solution was then slowly added over 25 min to the hot molybdate/tungstate solution. The resulting mixture was continuously stirred at 90° C. for 1 hour. The pH of the solution was around 6. A dark purplish brown precipitate that formed in the process was collected by filtration. The precipitate was dispersed into 250 g of DI water at 70° C. The resulting slurry was stirred for 30 min., filtered, and the collected precipitate vacuum dried at room temperature overnight. The material was then further dried at 120° C. for 12 hr.

Example 3

Co—Mo—W Catalyst Precursor

A catalyst precursor of the formula $(NH_4)+\{[Co_{3.31}(OH)_{3.62}](Mo_{0.3}W_{0.7}O_4)_2\}$ was prepared according to the following procedure: 17.65 g of ammonium heptamolybdate $(NH_4)_6Mo_7O_{24}.4H_2O$ powder was dissolved in 800.00 g of deionized water at room temperature followed by addition of 24.66 g of ammonium metatungstate $(NH_4)_6H_2W_{12}O_{40}.xH_2O$ (>66.5% W). The pH of the resulting solution was within the range of 5.2-5.4. A second solution was prepared containing 58.26 g of cobalt nitrate hexahydrate dissolved in 50.0 g of deionized water. The pH of the resulting solution was within the range of 1-2. 30 ml of concentrated $(NH_4)OH$ was added to the solution with constant stirring. Initially moss green in color precipitate was formed later turning into a 2 layer mixture with a greenish suspension at the bottom and a top brownish layer. The cobalt containing mixture was then slowly added over 25 min to the molybdate/tungstate solution at room temperature. The pH of the resulting solution was within the range of 8-8.5. The mixture was heated to 80° C. and continuously stirred for 1 hour. A purplish grey suspension was filtered while hot. The precipitate was dispersed into 2.5 L of DI water at 70° C. The resulting slurry was stirred for 30 min (pH 7.6), filtered, and the collected precipitate vacuum dried at room temperature overnight. The material was then further dried at 120° C. for 12 hr.

Example 4

Extrusion Process

In this example, 40 g of dried catalyst precursor prepared as per examples 1-3 was mixed with 0.8 g of methocel, (a commercially available methylcellulose and hydroxypropyl methylcellulose polymer from Dow Chemical Company), and approximately 7 g of DI water was added. Another 7 g of water was slowly added until the mixture was of an extrudable consistency. The mixture was then extruded and dried under $N_2$ at 120° C. prior to sulfiding.

Example 5

Sulfidation DMDS Liquid Phase

The catalyst precursors of Examples 1-3 were placed in a tubular reactor. The temperature was raised from room temperature to 250° F. at a rate of 100° F./hr under $N_{2(g)}$ at 8 $ft^3$/hr. The reaction was continued for 1 hour after which time the N2 was switched off and replaced with $H_2$ at 8 $ft^3$/hr and 200 psig for 1 hour. Light VGO oil (end point below 950° F.) was pumped over the catalyst precursor at 250° F. at a rate of 130 cc/hr (1 LHSV) while the hydrogen gas rate at 8 cubic feet an hour was maintained. The catalyst precursor was then heated to 430° F. at a rate of 25° F./hr and dimethyl disulfide (DMDS) was added to the light VGO at a rate of 4 cc/hr for approximately 4 hr. The catalyst precursor was then heated to 600° F., and the rate of DMDS addition increased to 8 cc/hr. The temperature was maintained at 600° F. for 2 hours after which time sulfidation was complete.

Example 6

Sulfidation with DMDS Gas Phase

Catalyst precursors of Examples 1-3 extruded as per example 4 were placed in a tubular reactor. The temperature was raised to 450° F. at a rate of 100° F./hr under $N_{2(g)}$ at 8 ft$^3$/hr. The reaction was continued for 1 hour after which time the $N_2$ was switched off and replaced with $H_2$ at 8 ft$^3$/hr and 100 psig for 1 hour. The $H_2$ pressure was then increased to 300 psig and maintained for less than 1 hr, after which time dimethyl disulfide (DMDS) was added at a rate of 4 cc/hour and then reaction allowed to proceed for 4 hr. The catalyst precursor was then heated to 600° F. and the rate of DMDS addition increased to 8 cc/hr. The temperature was maintained at 600° F. for 2 hours after which time sulfidation was complete.

A Commercial Example

Appreciating the lower risk of easing the constraint posture of two-stage recycle hydrocracker operation guided by the above detailed understanding of the bases for this posture, the present process and catalyst system was deployed to sustainably minimize the low-value bleed of unconverted oil an produce commensurately more value-added fuel.

Two virtually identical hydrocrackers which have the same two-stage recycle configuration, operating conditions and feed were employed. Both were running at about 43.0 MBPD feed rates. The feed consisted of 88-95% ARDS VGO, 0-7% SR VGO and 0-5% Coker Gas Oil (CGO). The reactor inlet pressures were at around 2,500 psig. The hydrocrackers were targeting maximum middle distillate product yield (mainly jet) and maximum overall conversion of the feed. The feed conversion was limited by the need to bleed Unconverted Oil (UCO) from the recycle loop so as to assure that the heavy polynuclear aromatic (HPNA) sediment precursors stayed at an acceptable level.

Figure 11:
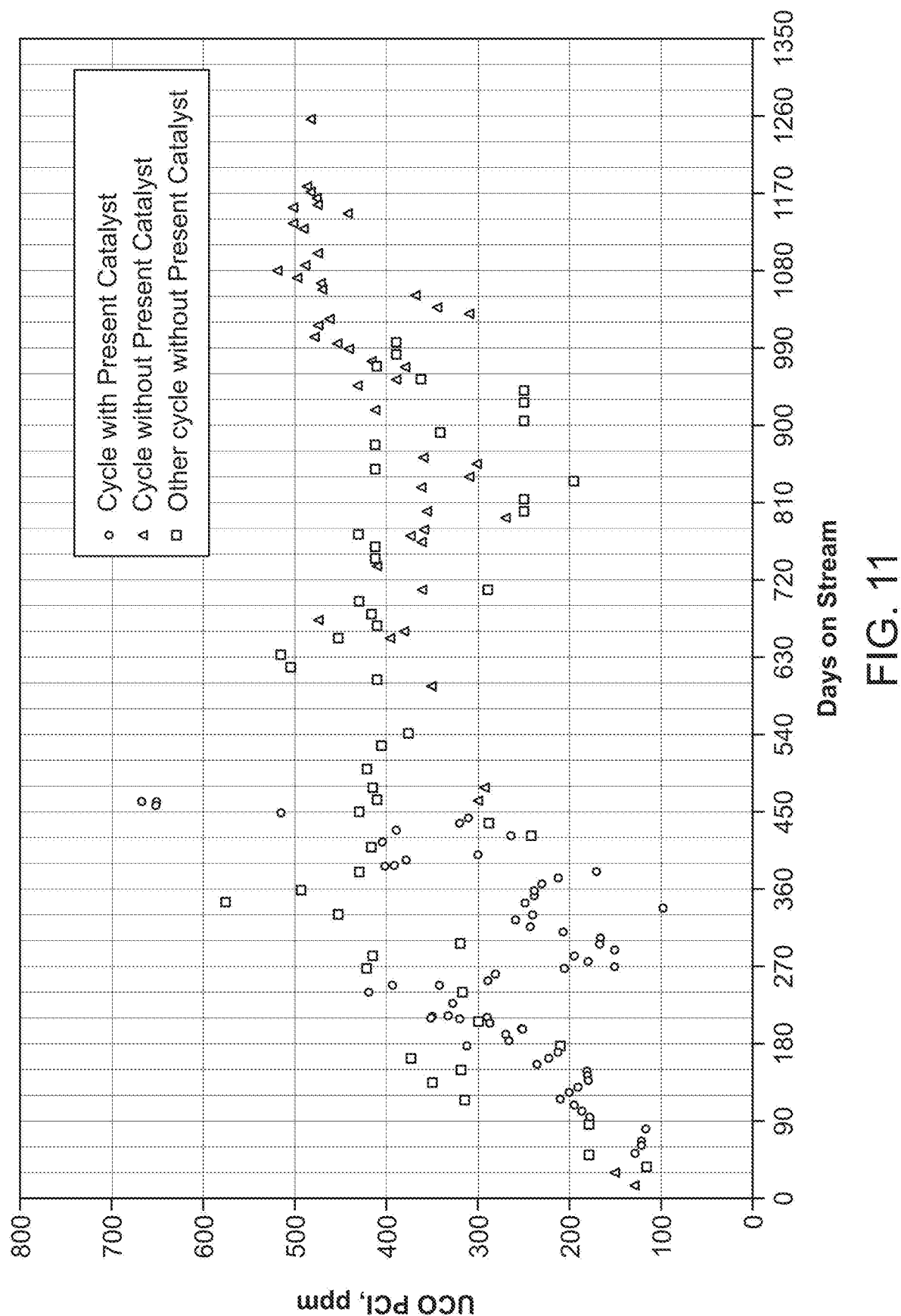
FIG. 11 graphically shows that present catalyst system maintains the PCI of the unconverted oil, despite the higher feed PCI.

The present catalyst was added to the catalyst system of one hydrocracker in the first reaction zone of the hydrocracker (second) stage. The result was to catalytically disrupt the buildup of sediment precursors in the UCO. The results were compared with the other hydrocracker's most recent two cycles which use virtually the same catalyst system but without the present bulk catalyst prepared from a multi-metallic precursor in hydroxide form. Due to changes in the refinery stock balance, the refiner had to increase the feed end boiling point (FIG. 7), and had to add some highly aromatic CGO (FIG. 8) to the cycle containing the present catalyst, and thus employing the present process. As a result, feed nitrogen content increased (FIG. 9), feed PCI increased (FIG. 10), and the feed became more aromatic. Even at about 450 days on stream the refiner kept the feed more aromatic as compared to the cycles without the present catalyst (FIGS. 7-10). Even though the properties of the feed for the run with the present catalyst in the system suggest that it is considerably more challenging, the PCI of the unconverted oil in the recycle stream of that run remained at a similar level, if not lower than the runs using only conventional hydrocracking catalyst only (FIG. 11).

Figure 12:
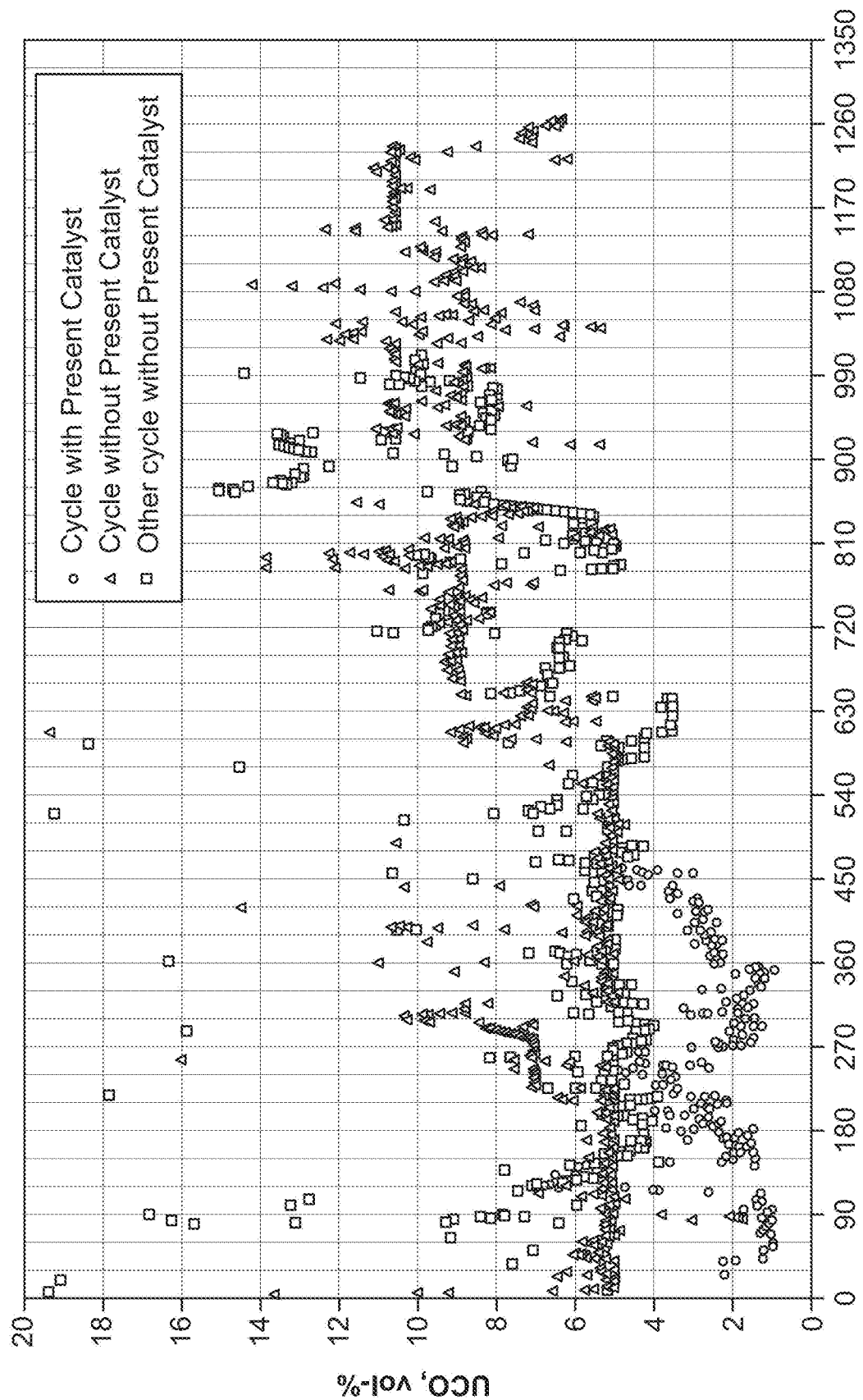
FIG. 12 graphically demonstrates that the present catalyst system affords lowering the bleed rate, which implies a higher yield of valuable product with the more recalcitrant feed (in terms of organic nitrogen content, PCI and end point).
Figure 13:
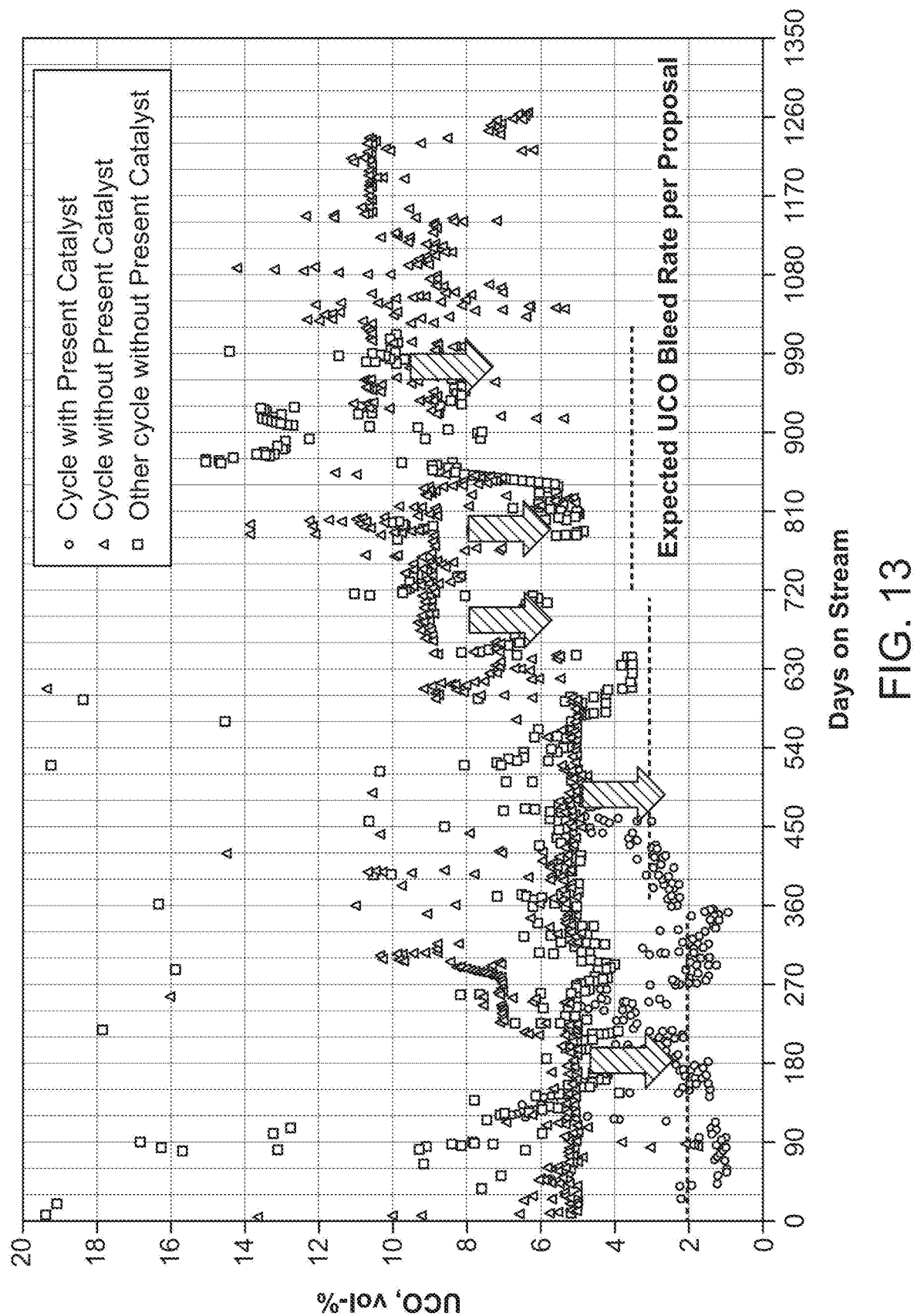
FIG. 13 shows that the expected cycle length is maintained when using the present system, despite the more recalcitrant feed and the significantly higher valuable product yield (lower bleed of unconverted oil).

In addition to addressing stock balance issues, (and more impactfully), when the refiner increases the product value by significantly reducing the bleed rate (FIG. 12), this bleed reduction appears not to reduce the cycle length. The total UCO bleed reduction in the present process cycle is projected to be approximately 2,000 Mbbl over the 3 years' cycle length, and the corresponding middle distillate production increase is estimated to be approximately 1,500-1,600 Mbbl (FIG. 13). The resulting economics can vary widely depending on the specific refinery's situation and the local, regional and global market conditions. However, assuming an average $10/bbl differential between middle distillates and unconverted oil, the impact of the bleed reduction alone easily amounts to $15-16 MM for the current cycle.

Operating hydrocrackers in recycle operation with ARDS VGO and CGO feed is a major challenge due to the risk of high polycyclic aromatics build-up and sedimentation terminating the run prematurely. Controlling the buildup of refractory aromatics becomes more challenging as the hydrocracker is running more toward full conversion of the feed to maximize diesel or jet production. Typically, the buildup of polycyclic aromatic sediment precursors and run length is—thereby—maintained by the judicious bleeding of unconverted oil. The present process and its use of the present catalyst system in the specific location more effectively disrupts the sedimentation.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A two-stage hydrocracking process with recycle for converting a petroleum feed to lower boiling products, which process comprises:
   (i) hydrotreating a petroleum feed comprising ARDS VGO in a first stage reaction column in the presence of hydrogen to produce a hydrotreated effluent stream comprising a liquid product;
   (ii) passing at least a portion of the hydrotreated stream effluent to a hydrocracking stage comprising more than one reaction zone in a second reaction column, with the effluent passed to a first reaction zone in the hydrocracking stage in the second reaction column, with the first reaction zone comprising a self-supported multi-metallic catalyst prepared from a precursor in the hydroxide form, and with the first reaction zone being the top level of the second reaction column, to produce a first hydrocracked effluent stream;
   (iii) passing the first hydrocracked effluent stream to a second reaction zone of the hydrocracking stage;
   (iv) passing bottoms from the hydrocracking stage to a distillation column;
   (v) recovering a bottoms fraction from the distillation column and recycling at least a portion of the bottoms fraction to the hydrotreating first stage and/or to the hydrocracking stage; and
   (vi) passing a minimized portion of the bottoms fraction in (v) to an FCC unit.

2. The process of claim 1, wherein the hydrocracking stage comprises four reaction zones.

3. The process of claim 1, wherein the hydrocracking stage comprises at least one reaction zone below the first reaction zone which is a hydrodesulfurization zone.

4. The process of claim 2, wherein the bottom reaction zone is a hydrodesulfurization zone.

5. The process of claim 3, wherein the hydrodesulfurization zone comprises a bulk multimetallic catalyst comprised of one Group VIII noble metal and two Group VIB metals.

6. The process of claim 1, wherein cuts of light naphtha, heavy naphtha, kerosene and diesel are recovered from the distillation column.

7. The process of claim 1, wherein the self-supported multi-metallic catalyst in the first reaction zone of the hydrocracking stage is a self-supported multi-metallic catalyst prepared by sulfiding a precursor catalyst in the hydroxide form of the general formula:

$$A_v[(M^P)OH)_x(L)^n{}_y]_z(M^{VIB}O_4), \text{ wherein:}$$

A is one monovalent cationic species;

$M^P$ is a promoter metal with an oxidation state of +2 or +4 selected from one or more of Group IIA, Group IIB, Group IVA, and Group VIII metals (especially a Group VIII, such as Ni);

L is an organic oxygen-containing ligand; and $M^{VIB}$ is a Group VIB metal.

8. The process of claim 7, wherein the catalyst precursor $M^P:M^{VIB}$ has an atomic ratio between 100:1 and 1:100.

9. The process of claim 7, wherein $M^P$ is nickel (Ni), $M^{VIB}$ is selected from molybdenum (Mo), tungsten (W) or a combination thereof.

10. The process of claim 9, wherein the catalyst precursor comprises Ni—Mo—W.

11. The process of claim 10, wherein Ni:(Mo+W) has a molar ratio of 10:1 to 1:10.

12. The process of claim 7, wherein L is a maleate ligand.

\* \* \* \* \*